(12) United States Patent
Nishiguchi

(10) Patent No.: US 10,477,558 B2
(45) Date of Patent: Nov. 12, 2019

(54) INFORMATION PROCESSING SYSTEM, SERVER, AND TERMINAL DEVICE

(71) Applicant: FUJITSU LIMITED, Kawasaki-shi, Kanagawa (JP)

(72) Inventor: Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 15/625,081

(22) Filed: Jun. 16, 2017

(65) Prior Publication Data

US 2018/0014295 A1 Jan. 11, 2018

(30) Foreign Application Priority Data

Jul. 5, 2016 (JP) ................................. 2016-133442

(51) Int. Cl.
*H04W 72/04* (2009.01)
*H04L 29/08* (2006.01)
*H04L 29/06* (2006.01)
*H04W 76/25* (2018.01)

(52) U.S. Cl.
CPC ....... *H04W 72/048* (2013.01); *H04L 67/1095* (2013.01); *H04L 67/142* (2013.01); *H04L 67/143* (2013.01); *H04L 67/42* (2013.01); *H04W 76/25* (2018.02)

(58) Field of Classification Search
None
See application file for complete search history.

(56) References Cited

U.S. PATENT DOCUMENTS

| 2004/0170133 | A1  | 9/2004 | Oguchi et al.      |              |
|--------------|-----|--------|--------------------|--------------|
| 2005/0086376 | A1* | 4/2005 | Park ............... | H04L 67/24   |
|              |     |        |                    | 709/245      |
| 2007/0038853 | A1* | 2/2007 | Day ............... | H04L 63/0281 |
|              |     |        |                    | 713/153      |
| 2008/0077690 | A1* | 3/2008 | Miyajima .......... | G06F 9/5088  |
|              |     |        |                    | 709/226      |

(Continued)

FOREIGN PATENT DOCUMENTS

| JP | 2004-320649 | 11/2004 |
|----|-------------|---------|
| JP | 2004-320694 | 11/2004 |
| JP | 2009-294915 | 12/2009 |

*Primary Examiner* — Edan Orgad
*Assistant Examiner* — Emmanuel K Maglo
(74) *Attorney, Agent, or Firm* — Stass & Halsey LLP

(57) ABSTRACT

A system includes: a server; and a terminal. The server manages a first connection state indicating a state of connection with the terminal based on whether the connection with the terminal is determined as established, and performs deallocation or reuse of a server-side resource allocated by the server, based on whether the first connection state is synchronized with a second connection state managed in the terminal. The terminal repeatedly checks a connection with the server using the connection path including the at least part in which the wireless communication is performed, and manages the second connection state indicating a state of the connection with the server, based on whether the connection with the server is determined as established. The terminal performs deallocation or reuse of a terminal-side resource allocated by the terminal, based on whether the second connection state is synchronized with the first connection state.

8 Claims, 27 Drawing Sheets

(56) References Cited

U.S. PATENT DOCUMENTS

| | | | |
|---|---|---|---|
| 2008/0228923 A1* | 9/2008 | Chidambaran | H04L 67/14 709/227 |
| 2010/0036957 A1* | 2/2010 | Patel | G06F 9/54 709/227 |
| 2014/0082128 A1* | 3/2014 | Beard | H04L 29/08549 709/216 |
| 2014/0280955 A1* | 9/2014 | Stuntebeck | H04L 63/0435 709/226 |
| 2015/0256308 A1* | 9/2015 | Ma | H04L 5/0035 370/330 |

* cited by examiner

FIG. 5

| TERMINAL ID | CONNECTION STATE | OFF-LINE DETERMINATION TIME |
|---|---|---|
| 001 | ON-LINE | 1 SECOND |
| 002 | ON-LINE | 1 SECOND |
| 003 | ON-LINE | 1 SECOND |

| SERVICE ID | SERVICE NOTIFICATION DESTINATION | TERMINAL ID LIST |
|---|---|---|
| 1001 | http://aaa.bbb | 001,002 |
| 1002 | http://ccc.ddd | 001,002,003 |
| 1003 | http://eee.fff | 003 |

| APP ID | NOTIFICATION DESTINATION | SERVICE ID LIST |
|---|---|---|
| 11 | CALL-BACK | 1001,1002 |
| 12 | INTENT INFORMATION | 1003 |
| 13 | CALL-BACK | 1001,1003 |

| TERMINAL ID | CONNECTION STATE | OFF-LINE DETERMINATION TIME | UNAVAILABLE SERVICE ID LIST |
|---|---|---|---|
| 001 | ON-LINE | 1 SECOND | 1001,1002 |
| 002 | ON-LINE | 1 SECOND | 1001,1002 |
| 003 | ON-LINE | 1 SECOND | 1002 |

| SERVICE ID | SERVICE NOTIFICATION DESTINATION | SERVICE STATE | TERMINAL ID LIST |
|---|---|---|---|
| 1001 | http://aaa.bbb | UNAVAILABLE | 001,002 |
| 1002 | http://ccc.ddd | UNAVAILABLE | 001,002,003 |
| 1003 | http://eee.fff | AVAILABLE | 001 |

| APP ID | NOTIFICATION DESTINATION | SERVICE ID LIST/SERVICE STATE |
|---|---|---|
| 11 | CALL-BACK | 1001/UNAVAILABLE, 1002/UNAVAILABLE |
| 12 | INTENT INFORMATION | 1003/AVAILABLE |
| 13 | CALL-BACK | 1001/UNAVAILABLE, 1003/AVAILABLE |

330A

ТИОН PROCESSING SYSTEM,
SERVER, AND TERMINAL DEVICE

CROSS-REFERENCE TO RELATED
APPLICATION(S)

This application is based upon and claims the benefit of priority of the prior Japanese Patent Application No. 2016-133442, filed on Jul. 5, 2016, the entire contents of which are incorporated herein by reference.

FIELD

The embodiments discussed herein are related to an information processing system, a server, a terminal device, a non-transitory computer-readable storage medium, and a method for synchronizing between a server and a terminal device.

BACKGROUND

In recent years, with the widespread use of computer networks and others, a system has been popular in which a terminal device (client) or the like uses services provided by another information processing apparatus (server) or the like via the networks.

This system is known such that the server deallocates resources when the resources are not used for a fixed period. Moreover, this system is also known such that after a disconnection of wireless communication with the server, the terminal device checks whether resources are present in the terminal device itself in the course of re-establishing connection after the disconnection, and reuses the resources if present, or performs a connection process with the server if not present. The related arts are disclosed in, for example, Japanese Laid-open Patent Publication Nos. 2009-294915 and 2004-320694.

SUMMARY

According to an aspect of the invention, an information processing system includes: a server configured to execute a first process that includes managing a first connection state indicating a state of connection with the terminal device based on whether the connection with the terminal device is determined as established, and execute a second process that includes performing deallocation or reuse of a server-side resource allocated by the server, based on whether the first connection state is synchronized with a second connection state managed in the terminal device; and a terminal device configured to perform wireless communication in at least a part of a connection path to the server, execute a third process that includes repeatedly checking a connection with the server using the connection path including the at least part in which the wireless communication is performed, and managing the second connection state indicating a state of the connection with the server, based on whether the connection with the server is determined as established, and execute a fourth process that includes performing deallocation or reuse of a terminal-side resource allocated by the terminal device, based on whether the second connection state is synchronized with the first connection state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table illustrating an example of a connection state holding database of the server in the first embodiment;

FIG. 6 is a table illustrating an example of a service use information database of the server in the first embodiment;

FIG. 8 is a table illustrating an example of an app use information table in the first embodiment;

FIG. 19 is a table illustrating an example of a connection state holding database in the second embodiment;

FIG. 20 is a table illustrating an example of a service use information database in the second embodiment;

FIG. 21 is a table illustrating an example of an app use information table in the second embodiment;

DESCRIPTION OF EMBODIMENTS

In the related arts described above, under conditions where the wireless communication between the server and the terminal device is frequently disconnected, for example, the reconnection from the terminal device to the server may be also frequently carried out. The terminal device executes a resource checking process that checks the presence of resources every time the reconnection is executed, so that the frequently repeated reconnection to the server may cause an increase in load in the resource checking process.

As one aspect of the embodiment, providing are solutions for being able to suppress an increase in load due to the resource checking process.

(First Embodiment)

Figure 1:
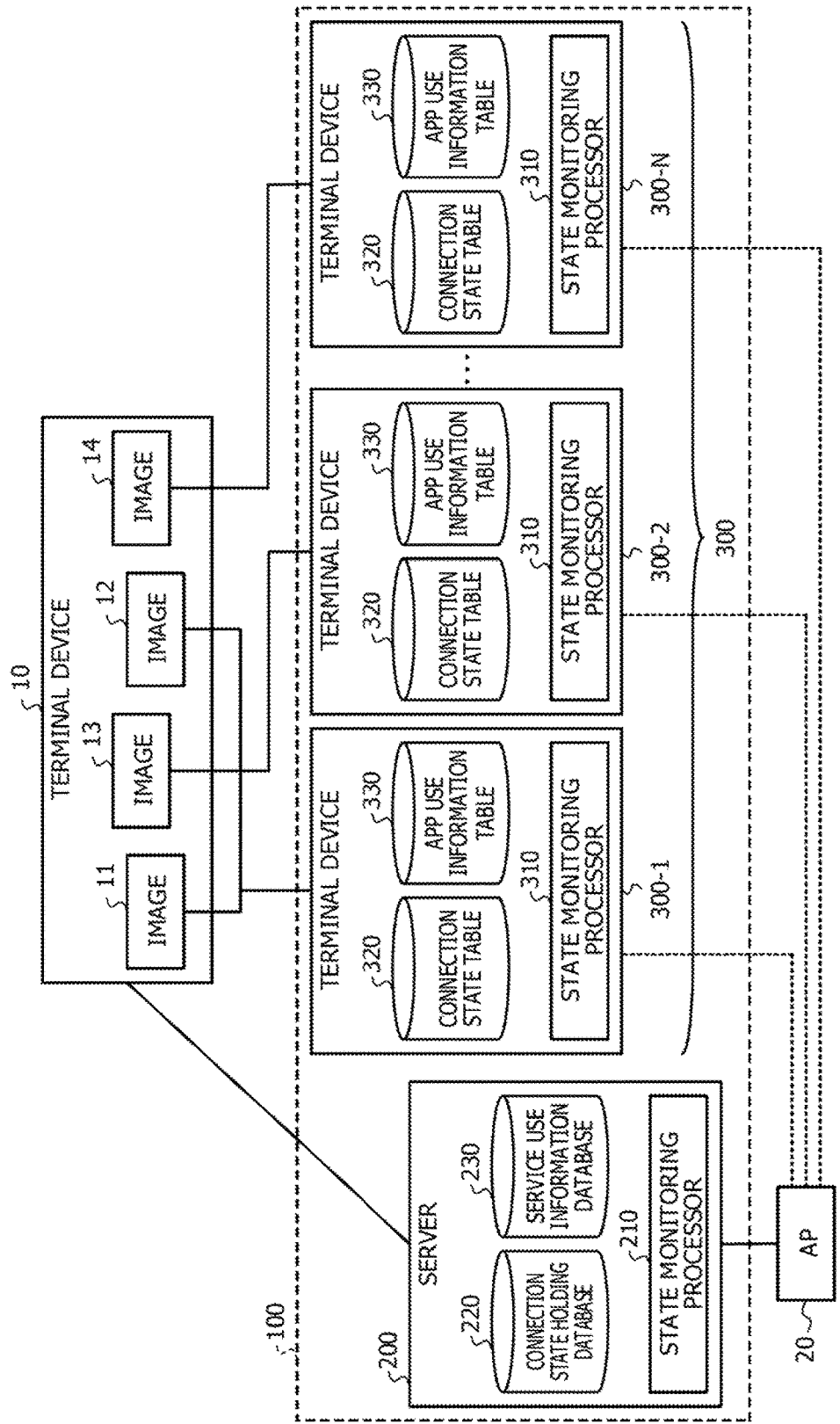
FIG. 1 is a diagram explaining an overview of an information processing system according to a first embodiment.

A first embodiment will be described below with reference to the drawings. FIG. 1 is a diagram explaining an overview of an information processing system according in the first embodiment.

An information processing system 100 in the first embodiment includes a server 200, and terminal devices 300-1, 300-2, ..., and 300-N. In the following explanation, the terminal devices 300-1, 300-2, ..., and 300-N are simply called "terminal device 300" when each of the terminal devices 300-1, 300-2, ..., and 300-N is not distinguished.

In the information processing system 100 in the first embodiment, the server 200 performs the wireless communication with the terminal device 300 via an access point 20, and the server 200 provides service in accordance with various kinds of requests by the terminal device 300.

The information processing system 100 illustrated in FIG. 1 represents an example of a system that projects images in screens displayed on displays of the multiple terminal devices 300 into one projection region 10 by a projector or the like.

In the projection region 10, images 11 and 12 are obtained by projecting images displayed on the display of the terminal device 300-1, and an image 13 is obtained by projecting an image displayed on the display of the terminal device 300-2. Moreover, an image 14 is obtained by projecting an image displayed on the display of the terminal device 300-N.

These images are projected into the projection region 10 in such a manner that each of the terminal devices 300-1, 300-2, ..., and 300-N transmits image data to the server 200, and the server 200 causes the projector to project the image data.

Meanwhile, in the information processing system 100 illustrated in FIG. 1, the communication between the server 200 and the terminal device 300 are performed in real time, however, there is a possibility that the connection in the wireless communication may be frequently disconnected depending on the environment.

Therefore, in the first embodiment, state monitoring processors that manage information indicating a state of the connection between the server 200 and the terminal device 300 are respectively provided in the server 200 and each of the terminal devices 300, and the information indicating a state of the connection is synchronized in the server 200 and each of the terminal devices 300. Further, in the first embodiment, after the information indicating a state of the connection is synchronized, the server 200 and the terminal device 300 are caused to deallocate or reuse resources.

Accordingly, in the information processing system 100 in the first embodiment, the server 200 and the terminal devices 300 may deallocate resources only when being instructed to deallocate the resources by the respective state monitoring processors.

Therefore, with the first embodiment, the server 200 and the terminal device 300 are not requested to perform a process for checking whether resources are allocated. In other words, with the first embodiment, in connection after the communication between the terminal device 300 and the server 200 is disconnected, the terminal device 300 do not have to perform the process of checking whether resources are allocated (resource checking process). Accordingly, with the first embodiment, an increase in load due to the resource checking process may be suppressed.

Noted that the resource in the server 200 for providing service to the terminal device 300 is called a service-side resource in the following explanation. Moreover, in the following explanation, the resource used by an application of the terminal device 300 for receiving the provision of the service is called a terminal-side resource.

Moreover, the resource in the first embodiment represents the processing speed or the memory capacitance of an arithmetic processor requested to cause software or hardware to operate, the capacitance of a hard disk, and the like.

The server 200 in the first embodiment includes a state monitoring processor 210, a connection state holding database 220, and a service use information database 230. The state monitoring processor 210 controls timing of the deallocation of resources for providing service to the terminal device 300, in accordance with a result of monitoring a state between the server 200 and the terminal device 300.

The connection state holding database 220 stores therein information indicating a state of connection (connection state information) between the server 200 and each of the terminal devices 300. The service use information database 230 stores therein information related to the service that is provided to an application of each of the terminal devices 300.

The terminal device 300 in the first embodiment includes a state monitoring processor 310, a connection state table 320, and an app use information table 330. The state monitoring processor 310 controls timing of the deallocation of resources that an application of the terminal device 300 uses for receiving service, in accordance with a result of monitoring a state between the terminal device 300 and the server 200.

The connection state table 320 stores therein connection state information that is information indicating a state of connection between the terminal device 300 and the server 200. The app use information table 330 stores therein information related to the use of the service by an application installed in the terminal device 300.

Hereinafter, with reference to FIGS. 2 and 3, the reuse and the deallocation of the service-side resource and the terminal-side resource in the server 200 and the terminal device 300 in the first embodiment will be described.

Figure 2:
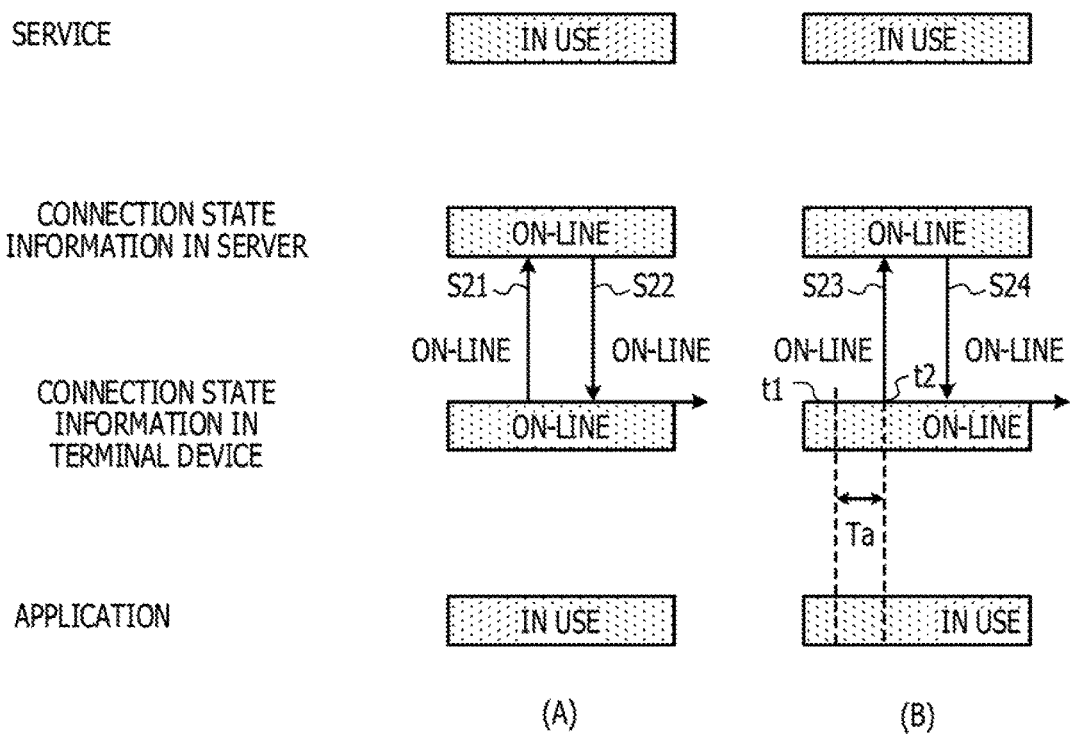
FIG. 2 is a diagram explaining operations of the reuse of resources.

FIGS. 2 ((A) and (B)) is a diagram explaining operations of the reuse of resources. FIG. 2(A) illustrates a case where connection state information indicates the on-line between the server 200 and each of the terminal devices 300. FIG. 2(B) illustrates a case where connection state information on the server 200 indicates the on-line, and connection state information on the terminal device 300 temporarily becomes the off-line.

Noted that in the first embodiment, in addition to a state where the server 200 and the terminal device 300 are connected with wireless communication, a state where the connection is determined as established by a heart-beat signal, which is described later, is expressed as the connection state information indicating the on-line. Moreover, a state where the connection between the server 200 and the terminal device 300 is determined as not established is expressed as the connection state information indicating the off-line.

The terminal device 300 in the first embodiment in a state being connected to the server 200 periodically transmits signals in order to indicate that the connection between the terminal device 300 itself and the server 200 is active. In the following explanation, the signals are called heart-beat signals. It is assumed that the terminal device 300 in the first embodiment transmits connection state information to the server 200, with the heart-beat signals.

When the server 200 in the first embodiment receives connection state information from the terminal device 300, the server 200 transmits, only in a case where the connection state information from the terminal device 300 indicates the on-line and connection state information on the server 200 itself indicates the off-line, connection state information indicating the off-line to the terminal device 300, and in other cases, transmits connection state information indicating the on-line to the terminal device 300. Moreover, when the server 200 in the first embodiment receives no heart-beat signal during a predetermined period, the server 200 regards the communication with the terminal device 300 as being disconnected, sets the connection state information on the server 200 itself to the off-line, and causes the service-side resource to be deallocated.

Meanwhile, when the terminal device 300 in the first embodiment is not able to transmit heart-beat signals to the server 200 during a predetermined period, the terminal device 300 determines the communication with the server 200 as being disconnected, set the connection state information on the terminal device 300 itself to the off-line, and causes the terminal-side resource to be deallocated.

In other words, the server 200 and each of the terminal devices 300 in the first embodiment respectively determine, in a case where a period during when no heart-beat signal is transmitted and received is shorter than the predetermined period, the communication as being active, and maintain the connection state information as the on-line.

In FIG. 2(A), the server 200 and the terminal device 300 are connected to each other. Therefore, the terminal device 300 transmits connection state information indicating the on-line with heart-beat signals, to the server 200 (Step S21).

The server 200 receives the connection state information, and returns connection state information on the server 200 to the terminal device 300 (Step S22). In this time, the connection state information on the server 200 also indicates the on-line, the connection state information on the server 200 and the connection state information on the terminal device 300 are synchronized.

Accordingly, in the state of FIG. 2(A), the service provided by the server 200 does not interrupt the use of the service-side resource, and the use of the terminal-side resource for receiving the provision of the service is also not interrupted in the application of the terminal device 300. In other words, the server 200 may continuously use the service-side resource, and the terminal device 300 may continuously use the terminal-side resource.

In FIG. 2(B), a wireless connection between the server 200 and the terminal device 300 is disconnected in a period Ta from a timing t1 to a timing t2. Accordingly, during the period Ta, no heart-beat signal is transmitted from the terminal device 300 to the server 200.

In FIG. 2(B), when the communication with the server 200 becomes possible at the timing t2, the terminal device 300 transmits connection state information to the server 200 (Step S23).

In this time, the period Ta is set as a period shorter than the predetermined period for which the server 200 determines that the communication with the terminal device 300 is disconnected. Accordingly, the terminal device 300 maintains the connection state information on the terminal device 300 itself as being on-line, and transmits connection state information indicating the on-line to the server 200.

This causes the server 200 to maintain connection state information as being on-line during the period Ta in FIG. 2(B) by regarding that the communication with the terminal device 300 is being connected. Accordingly, the server 200 receives the connection state information from the terminal device 300, and transmits connection state information indicating the on-line to the terminal device 300 (Step S24).

The connection state information on the terminal device 300 is managed independent of the connection in the wireless communication, and therefore is maintained as being on-line during the period Ta when the wireless connection is disconnected.

Accordingly, in the state of FIG. 2(B), the service provided by the server 200 does not interrupt the use of the service-side resource, and the use of the terminal-side resource for receiving the provision of the service is also not interrupted in the application of the terminal device 300.

In other words, although the communication between the server 200 and the terminal device 300 is temporarily disconnected in FIG. 2(B), the application of the terminal device 300 reuses the terminal-side resource having been allocated before the disconnection even after the communication is recovered after the disconnection. Therefore, in the example of FIG. 2(B), the terminal device 300 does not have to perform a resource checking process after the disconnection of the communication is recovered, so that the increase in load due to the resource checking process is suppressed.

Figure 3:
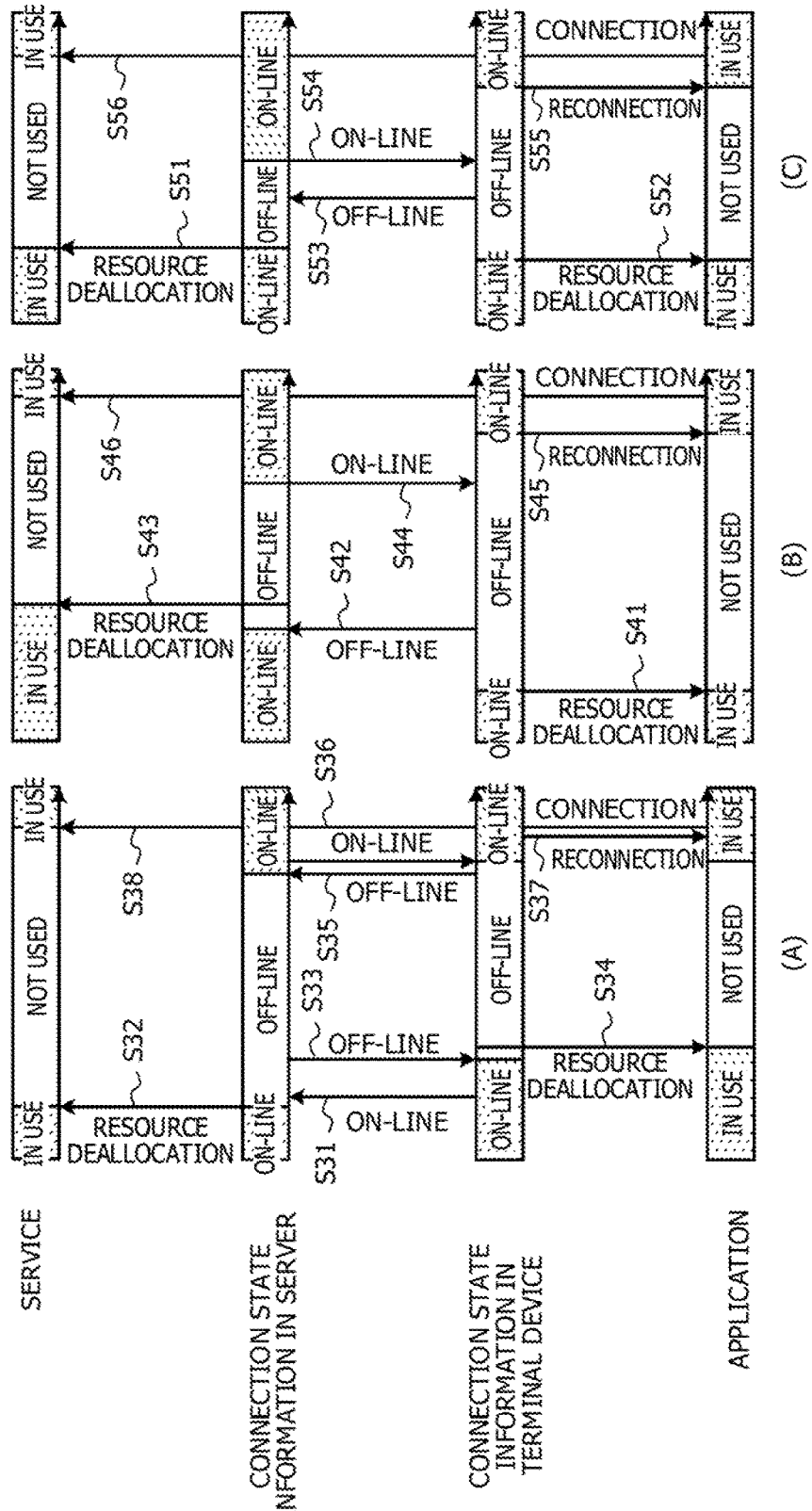
FIG. 3 is a diagram explaining operations of the deallocation of resources.

FIG. 3 ((A) to (C)) is a diagram explaining operations of the deallocation of resources. FIG. 3(A) illustrates a case where when connection state information on the terminal device 300 indicates the on-line and connection state information on the server 200 indicates the off-line, connection state information is transmitted from the terminal device 300 to the server 200.

In FIG. 3(A), the terminal device 300 transmits connection state information indicating the on-line to the server 200 (Step S31). At a time when the server 200 receives the connection state information, the server 200 is in a state where a deallocation instruction of the service-side resource to the service has been already performed (Step S32) and the connection state information indicates the off-line in the server 200. Accordingly, the server 200 returns connection state information indicating the off-line to the terminal device 300 (Step S33).

The case where the server 200 sets connection state information on the server 200 itself to the off-line and makes a deallocation instruction of the service-side resource is, for example, a case where the server 200 receives no connection state information from the terminal device 300 during a predetermined period, and other cases. In this case, the server 200 regards the communication with the terminal device 300 as being disconnected, and changes connection state information on the server 200 itself from the on-line to the off-line to deallocate the service-side resource.

When the terminal device 300 receives the connection state information indicating the off-line from the server 200, the terminal device 300 makes a deallocation instruction of the terminal-side resource to an application (Step S34). When the application receives the deallocation instruction, the application deallocates the terminal-side resource for receiving the provision of the service. Here, the connection state information on the server 200 and the connection state information on the terminal device 300 indicate the off-line, and the connection states are synchronized.

When the terminal device 300 completes the process of synchronizing the connection state information set to the off-line with the connection state information on the server 200, the terminal device 300 transmits connection state information indicating the off-line to the server 200 (Step S35).

In response to the connection state information set to the off-line in the terminal device 300, the server 200 changes the connection state information from the off-line to the on-line, and returns connection state information indicating the on-line to the terminal device 300 (Step S36).

When the terminal device 300 receives the connection state information indicating the on-line from the server 200, the terminal device 300 sets connection state information indicating the off-line to the on-line, and causes the application to allocate the terminal-side resource (Step S37). In other words, the terminal device 300 instructs the application to reconnect the service. In other words, the terminal device 300 causes the application to request the provision of the service.

In this time, the connection state information on the server 200 and the connection state information on the terminal device 300 indicate the on-line, and both of the connection state information on the server 200 and the connection state information on the terminal device 300 are synchronized. When the connection state information is synchronized between the server 200 and the terminal device 300, the application of the terminal device 300 requests the provision of the service of the service (Step S38).

FIG. 3(B) illustrates a case where connection state information on the terminal device 300 indicates the off-line and connection state information on the server 200 indicates the on-line, connection state information is transmitted from the terminal device 300 to the server 200.

In the example of FIG. 3(B), in the terminal device 300, connection state information is set to the off-line, a deallocation instruction of the terminal-side resource is made (Step S41).

In this state, when the communication between the server 200 and the terminal device 300 is started, the terminal device 300 transmits connection state information indicating the off-line to the server 200 (Step S42). When the server 200 receives the connection state information, the server 200 changes connection state information on the server 200 itself from the on-line to the off-line, and instructs the service to deallocate the service-side resource (Step S43).

Here, the connection state information on the server 200 and the connection state information on the terminal device 300 indicate the off-line, and the connection states are synchronized.

When the connection state information on the server 200 is synchronized with that on the terminal device 300, the server 200 changes the connection state information on the server 200 itself from the off-line to the on-line, and transmits the connection state information indicating the on-line to the terminal device 300 (Step S44).

When the terminal device 300 receives the connection state information indicating the on-line, the terminal device 300 changes connection state information on the terminal device 300 itself from the off-line to the on-line, and causes the application to allocate the terminal-side resource (Step S45).

In this time, the connection state information on each of the server 200 and the terminal device 300 indicates the on-line, and thus the connection states are synchronized. When the connection states are synchronized between the server 200 and the terminal device 300, the application of the terminal device 300 requests the provision of the service of the service (Step S46).

FIG. 3(C) illustrates a case where both of connection state information on the server 200 and connection state information on the terminal device 300 indicate the off-line, connection state information is transmitted from the terminal device 300 to the server 200.

In the example of FIG. 3(C), in the server 200, connection state information is set to the off-line, an a deallocation instruction of the service-side resource is made (Step S51). Moreover, in the terminal device 300, connection state information is set to the off-line, a deallocation instruction of the terminal-side resource is made (Step S52).

In this state, when the communication between the server 200 and the terminal device 300 is started, the terminal device 300 transmits connection state information indicating the off-line to the server 200 (Step S53). Here, the connection state information on the server 200 and the connection state information on the terminal device 300 indicate the off-line, and the connection states are synchronized.

Therefore, when the server 200 receives the connection state information, the server 200 changes connection state information on the server 200 itself from the off-line to the on-line, and transmits the connection state information indicating the on-line to the terminal device 300 (Step S54).

When the terminal device 300 receives the connection state information indicating the on-line, the terminal device 300 changes connection state information on the terminal device 300 itself from the off-line to the on-line, and causes the application to allocate the terminal-side resource (Step S55).

In this time, the connection state information on each of the server 200 and the terminal device 300 indicates the on-line, and thus the connection states are synchronized. When the connection states are synchronized between the server 200 and the terminal device 300, the application of the terminal device 300 requests the provision of the service of the service (Step S56).

The processes at Step S53 and subsequent Steps in FIG. 3(C) are the same as the processes at Step S35 and subsequent Steps in FIG. 3(A).

The forgoing describes the operations by the state monitoring processor 210 of the server 200 and the state monitoring processor 310 of the terminal device 300, in the information processing system 100 in the first embodiment.

As understood from FIGS. 2 and 3, when both of connection state information on the server 200 and connection state information on the terminal device 300 are synchronized as the on-line, the information processing system 100 in the first embodiment does not deallocate but continuously use the service-side resource and the terminal-side resource.

Moreover, when connection state information on the server 200 and connection state information on the terminal device 300 are not synchronized, the information processing system 100 in the first embodiment synchronizes both of the connection state information as the off-line once, and causes the service-side resource and the terminal-side resource to be deallocated. Further, the information processing system 100 synchronizes thereafter the connection state information on the server 200 and the connection state information on the terminal device 300 as the on-line, and causes the service-side resource and the terminal-side resource to be allocated.

Moreover, when both of connection state information on the server 200 and connection state information on the terminal device 300 are synchronized as the off-line, the information processing system 100 in the first embodiment synchronizes the connection state information on the server 200 and the connection state information on the terminal device 300 as the on-line, and causes the service-side resource of the terminal-side resource to be allocated.

Accordingly, with the first embodiment, the server 200 and the terminal device 300 respectively perform the continuous use of resources (reuse), the deallocation and the allocation of resources without performing the resource checking process that checks whether the service-side resource and the terminal-side resource are allocated. With the first embodiment, independent of the state of connection between the server 200 and the terminal device 300, the resource checking process is not requested, so that it is possible to suppress the increase in load due to the execution of the resource checking process.

Moreover, the information processing system 100 in the first embodiment manages the service-side resource and the terminal-side resource as is in the foregoing, so that it is possible to continue projection of images into a projection region 10, for example, even if the communication between the server 200 and the terminal device 300 is temporarily disconnected. Therefore, with the first embodiment, even in a case where the temporal disconnection of communication is frequently generated, it is possible to suppress a situation in which a projected image is frequently updated due to the disconnection of the communication.

Moreover, in the information processing system 100 in the first embodiment, in a case where connection state information is not transmitted from the terminal device 300 to the server 200 during a predetermined period, the server 200 sets connection state information on the server 200 itself to the off-line, and causes the service-side resource to be deallocated. Therefore, with the information processing system 100 in the first embodiment, in a case where the non-temporal disconnection of communication with the terminal device 300 is generated, it is possible to deallocate the service-side resource, and erase the received image received from the terminal device 300 the communication of which is disconnected, from the projection region 10.

Noted that the information processing system 100 in the first embodiment employs a form in which images displayed on the screens of the terminal devices 300 are projected into the projection region 10, but the form is not limited thereto. The first embodiment may be applied to any form as long as a form in which service is transferred in a state where the server 200 and the terminal device 300 are connected via the wireless communication all the time.

Figure 4:
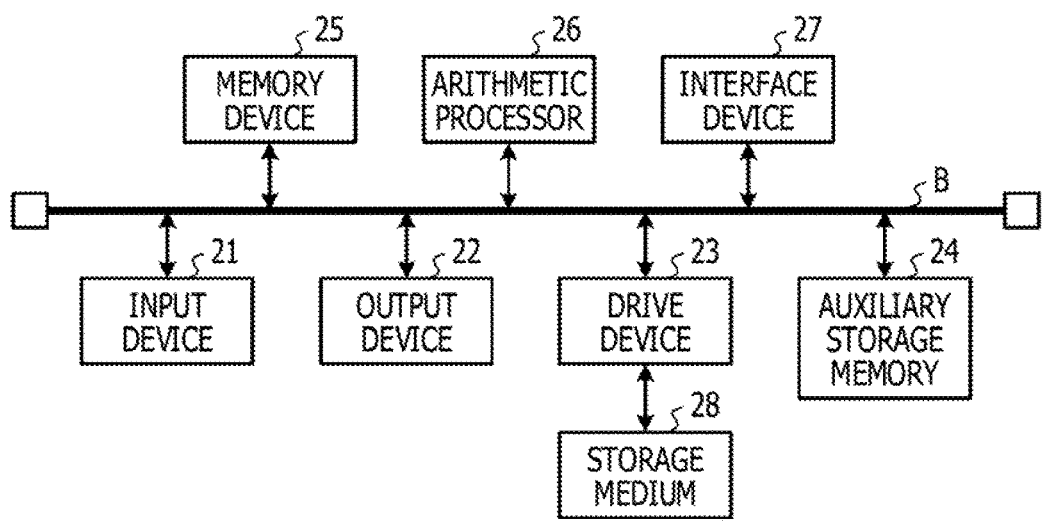
FIG. 4 is a diagram illustrating an example of a hardware configuration of a server.

Hereinafter, the server 200 and the terminal device 300 in the first embodiment will be described. FIG. 4 is a diagram illustrating an example of a hardware configuration of the server.

The server 200 in the first embodiment is, for example, a desktop or notebook computer, and includes an input device 21, an output device 22, a drive device 23, an auxiliary storage memory 24, a memory device 25, an arithmetic processor 26, and an interface device 27, which are mutually coupled via a bus B.

The input device 21 is a device into which various information is inputted, and is implemented by, for example, a key board or a mouse. The output device 22 is a device from which various information is outputted, and is implemented by, for example, a display. The interface device 27 includes a modem, a LAN card, or the like, and is used to be coupled to a network.

Information processing program is at least a part of various kinds of programs that control the server 200. The information processing program is provided by the distribution of a storage medium 28 or the information processing program being downloaded from the network, for example. As for the storage medium 28 on which the information processing program is recorded, various types of storage media may be used, which include a storage medium that optically, electrically, or magnetically records information such as a CD-ROM, a flexible disk, and a magneto-optical disk, a semiconductor memory that electrically records information such as a ROM and a flash memory, and others.

Moreover, when the storage medium 28 on which information processing program is recorded is set into the drive device 23, the information processing program is installed into the auxiliary storage memory 24 from the storage medium 28 via the drive device 23. The information processing program having been downloaded from the network is installed into the auxiliary storage memory 24 via the interface device 27.

The auxiliary storage memory 24 stores therein the installed information processing program, and stores therein predetermined files, data, and others. The memory device 25 reads information processing program from the auxiliary storage memory 24 when a computer is started up, and stores therein the information processing program. The arithmetic processor 26 implements various kinds of processes, which are described later, in accordance with the information processing programs stored in the memory device 25.

Moreover, the server 200 in the first embodiment may be, for example, a tablet-type computer or the like. In that case, the server 200 may include, instead of the input device 21 and the output device 22, a display operation device having a display function, such as a touch panel. Noted that the terminal device 300 in the first embodiment is, for example, a smartphone or a typical tablet-type computer, and a hardware configuration thereof is similar to that of the server 200 illustrated in FIG. 4; thus, an explanation thereof is omitted.

Next, with reference to FIGS. 5 to 8, databases and tables, which are respectively included in the server 200 and the terminal device 300 in the first embodiment will be described.

FIG. 5 is a table illustrating an example of a connection state holding database of the server in the first embodiment. The connection state holding database 220 in the first embodiment is provided in advance in the server 200. The connection state holding database 220 in the first embodiment includes, as items of information, a terminal ID, a connection state, and an off-line determination time.

A value of the item "terminal ID" is an identifier for identifying the terminal device 300. The value of the item "terminal ID" assigned in advance to the terminal device 300.

A value of the item "connection state" indicates a connection state between the server 200 and the terminal device 300. In the first embodiment, the value of the item "connection state" set to the on-line indicates a connected state of communication between the server 200 and the terminal device 300 that is identified by an associated terminal ID.

Meanwhile, the value of the item "connection state" set to the off-line indicates a disconnected state of communication between the server 200 and the terminal device 300 that is identified by an associated terminal ID.

A value of the item "off-line determination time" indicates a period for which the server 200 determines that the communication with the terminal device 300 is disconnected. For example, in a case where the value of the item "off-line determination time" is one second, the server 200 determines that the communication with the terminal device 300 is disconnected when the server 200 receives no heartbeat signal from the terminal device 300 for one second.

In the connection state holding database 220 in the embodiment, when the server 200 receives connection state information from the terminal device 300, the server 200 starts count-down (subtraction) of the off-line determination time. Further, when the server 200 receives connection state information from the terminal device 300 next time, the server 200 stops the count-down of the off-line determination time, and returns the off-line determination time to the period decided in advance (one second in FIG. 5).

In other words, when the server 200 receives connection state information from the terminal device 300, the server 200 resets the terminal ID of the terminal device 300 and the corresponding off-line determination time to be returned to an initial value, and starts the count-down, in the connection state holding database 220.

When the count-down of the off-line determination time is started and the value of the off-line determination time becomes 0 or less, the server 200 in the first embodiment determines that the communication with the terminal device 300 is disconnected.

FIG. 6 is a table illustrating an example of a service use information database of the server in the first embodiment. The service use information database 230 in the first embodiment includes, as items of information, a service ID, a service notification destination, and a terminal ID list, and the item "service ID" is associated with the other items. In the following explanation, information including a value of the item "service ID" and values of the other items is called service use information.

A value of the item "service ID" is an identifier for identifying service that is provided by the server 200 to the terminal device 300. A value of the item "service notification destination" is, for example, a uniform resource locator (URL) of representational state transfer application programming interface (REST API).

The REST API indicates one of the types of calling conventions of programs (API) for using the Web system from the outside, and is developed in accordance with a design principle called REST. The URL of the REST API represents, for example, a resource for providing service identified by a corresponding service ID.

A value of the item "terminal ID list" indicates a list of terminal IDs of the terminal devices 300 including applications that receive the provision of the service identified by the corresponding service ID.

In the example of FIG. 6, for example, service of a service ID "1001" is used by the terminal device 300 of a terminal ID "001" and the terminal device 300 of a terminal ID "002". When the terminal devices 300 of the terminal ID "001" and the terminal ID "002" are connected to the service of the service ID "1001", service use information including a service notification destination that is a URL for a resource deallocation request is registered from the service of the service ID "1001" to the server 200.

In this case, for example, when a connection state in the terminal device 300 of the terminal ID "001" becomes the off-line, the server 200 accesses a URL "http://aaa. bbb" and a URL "http://ccc. ddd", as for the service ID "1001" and the service ID "1002" that are the service used by the terminal ID "001", and deallocates resources used by the terminal ID "001".

Figure 7:
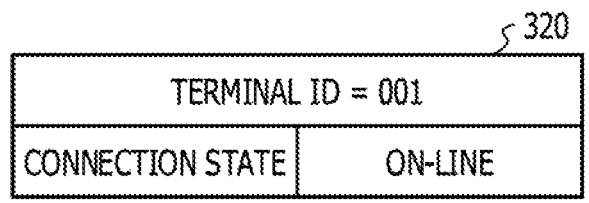
FIG. 7 is a table illustrating an example of a connection state table of a terminal device in the first embodiment.

FIG. 7 is a table illustrating an example of a connection state table of a terminal device in the first embodiment. In the connection state table 320 in the first embodiment, a terminal ID of the terminal device 300 is associated with connection state information indicating a connection state between the server 200 and the terminal device 300.

In the example of FIG. 7, it may be understood that the terminal device 300 of the terminal ID "001" has connection state information as "on-line" and is in a connected state with the server 200. In the connection state table 320, the connection state information is switched between the on-line and the off-line depending on the connection state between the terminal device 300 and the server 200.

FIG. 8 is a table illustrating an example of an app use information table in the first embodiment. The app use information table 330 in the first embodiment includes, as items of information, an app ID, a notification destination, and a service ID list, the item "app ID" is associated with the other items. In the following explanation, information including a value of the item "app ID" and values of the other items is called app use information.

The value of the item "app ID" indicates an identifier that identifies an application installed in the terminal device 300.

The value of the item "notification destination" indicates a procedure of giving an instruction to a corresponding application. For example, when an application identified by the app ID is described in HTML5 that is the standard of a markup language, an instruction is made to the application by call-back.

Moreover, for example, when an application identified by the app ID is an Android application on which Java (registered trademark) is mounted, an instruction is made to the application by intent information.

Noted that the instruction to the application is, for example, an instruction, such as deallocation instruction of the terminal-side resource and an instruction to cause the application to make a service use request to the service.

A value of the item "service ID list" indicates a list of identifiers of the service that is used by a corresponding application identified by the app ID.

In FIG. 8, for example, it may be understood that an application of an app ID "11" uses service of a service ID "1001" and service of a service ID "1002".

Next, with reference to FIG. 9, the server 200 and the terminal device 300, which are included in the information processing system 100 in the first embodiment, will be described.

Figure 9:
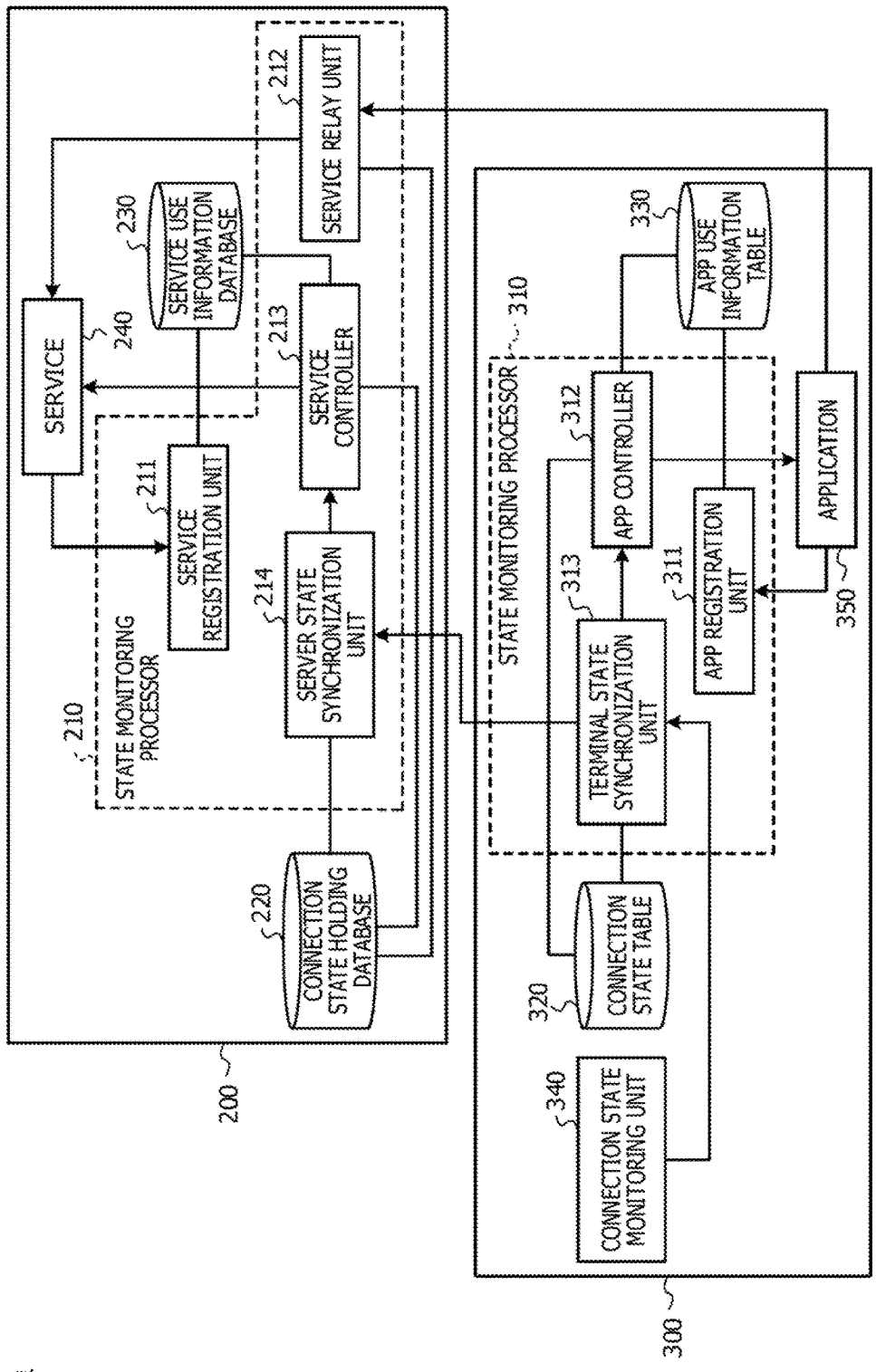
FIG. 9 is a diagram explaining functions of respective devices included in the information processing system in the first embodiment.

FIG. 9 is a diagram explaining functions of respective devices included in the information processing system in the first embodiment. Firstly, the function of the server 200 will be described.

The server 200 in the first embodiment includes the state monitoring processor 210, the connection state holding database 220, the service use information database 230, and service 240.

The state monitoring processor 210 includes a service registration unit 211, a service relay unit 212, a service controller 213, and a server state synchronization unit 214.

The server state synchronization unit 214 synchronizes connection state information in the connection state holding database 220 with connection state information in the terminal device 300. A detail of a process by the server state synchronization unit 214 will be described later.

When service is used from the terminal device 300, the service registration unit 211 makes a registration of a terminal ID of the terminal device 300 in the service use information database 230.

When the service relay unit 212 receives a use request of service to the service 240 from an application 350, which is described later, of the terminal device 300, the service relay unit 212 passes the use request to the service 240. The service 240 provides various kinds of service in response to the request to the application 350.

The service controller 213 refers to the service use information database 230, and performs control on the service 240. Specifically, the service controller 213 makes a deallocation instruction of the service-side resource, for example.

Next, a function of the terminal device 300 will be described. The terminal device 300 in the first embodiment includes the state monitoring processor 310, the connection state table 320, the app use information table 330, a connection state monitoring unit 340, and the application 350.

The state monitoring processor 310 in the first embodiment includes an app registration unit 311, an app controller 312, and a terminal state synchronization unit 313.

The app registration unit 311 makes a registration of the application 350 with respect to the app use information table 330.

The app controller 312 refers to the app use information table 330, and performs control on the application 350. Specifically, the app controller 312 makes a deallocation instruction of the terminal-side resource, for example.

The terminal state synchronization unit 313 determines whether the communication is possible based on the connection state monitoring unit 340. Moreover, the terminal state synchronization unit 313 synchronizes connection state information in the connection state table 320 with connection state information in the server 200. A detail of a process by the terminal state synchronization unit 313 will be described later.

The connection state monitoring unit 340 in the first embodiment monitors whether the terminal device 300 is in a communication possible state, and notifies the terminal state synchronization unit 313 when the communication becomes possible and when becomes impossible. In other words, the connection state monitoring unit 340 monitors whether the communication between the terminal device 300 and the server 200 is possible. More specifically, the connection state monitoring unit 340 monitors whether the terminal device 300 accesses the access point 20, and acquires an Internet Protocol (IP) address.

The application 350 makes a use request of service to the service 240 in response to an operation or the like to the terminal device 300, for example. In this time, the application 350 assigns a terminal ID of the terminal device 300 to the use request of service.

Next, the processes in the server 200 and the terminal device 300 in the first embodiment will be described. Firstly, the processes in the respective units included in the state monitoring processor 210 of the server 200 will be described.

Figure 10:
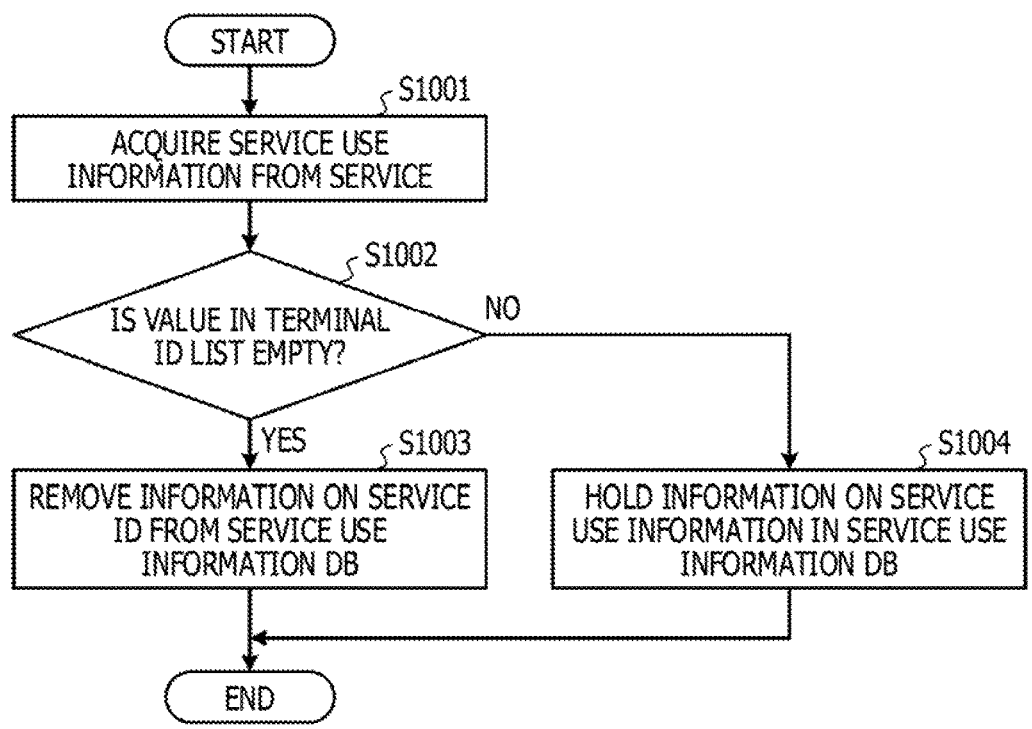
FIG. 10 is a flowchart explaining a process by a service registration unit of the server in the first embodiment.

FIG. 10 is a flowchart explaining a process by a service registration unit of the server in the first embodiment.

The service registration unit 211 in the first embodiment operates when the service 240 having received a use request from the application 350 of the terminal device 300 transmits service use information including the items "service ID", "service notification destination", and "terminal ID list" thereto. Firstly, the service registration unit 211 acquires service use information from the service (Step S1001). Further, when the application 350 normally ends the use of the service 240, service use information in which the terminal ID of the terminal that ends the use of the service is deleted is transmitted from the service 240 to the service registration unit 211. When no terminal 300 uses the service 240, service use information in which the "terminal ID list" is empty is transmitted from the service 240 to the service registration unit 211.

Subsequently, the service registration unit 211 determines whether the value of the item "terminal ID list" in the acquired service use information is empty (Step S1002).

If the value is empty at Step S1002, the service registration unit 211 deletes the acquired service use information from the service use information database 230 (Step S1003), and ends the process. Also in a case where the service 240 having received the use request is ended, or the like, the service registration unit 211 in the first embodiment registers service use information in which the value of the terminal ID list is empty to delete the service use information on the service to be ended.

If the value is not empty at Step S1002, the service registration unit 211 stores the acquired service use information in the service use information database 230 (Step S1004), and ends the process.

The service registration unit 211 in the first embodiment stores service use information in the service use information database 230 as is in the foregoing.

Figure 11:
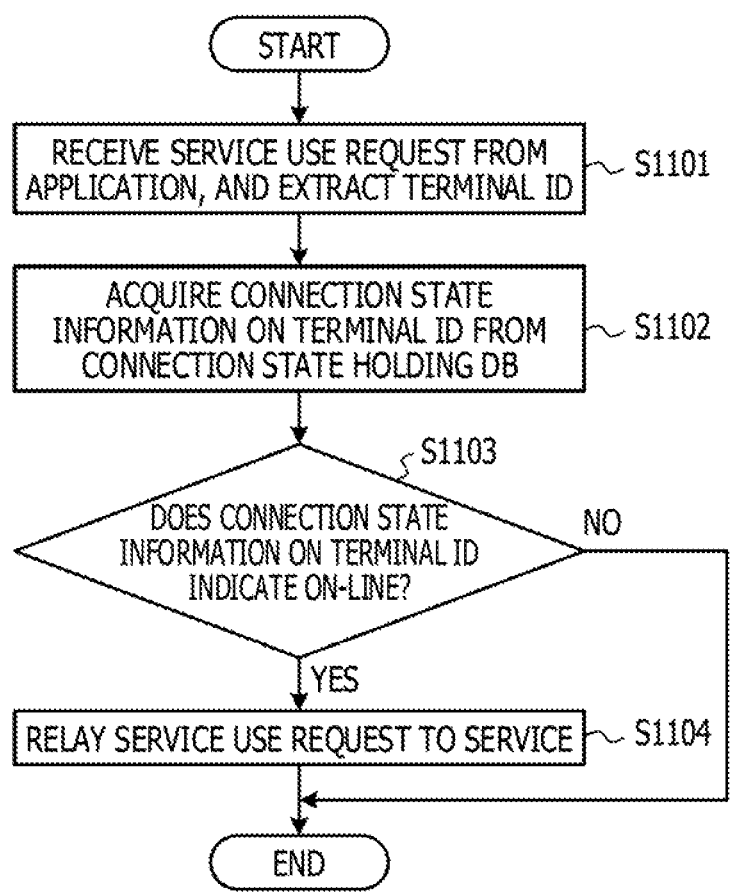
FIG. 11 is a flowchart explaining a process by a service relay unit of the server in the first embodiment.

Next, with reference to FIG. 11, a process by the service relay unit 212 of the state monitoring processor 210 in the first embodiment will be described. FIG. 11 is a flowchart explaining a process by a service relay unit of the server in the first embodiment.

When the service relay unit 212 in the first embodiment receives a use request of service from the application 350 of the terminal device 300, the service relay unit 212 extracts a terminal ID of the terminal device 300 assigned to the use request (Step S1101). Subsequently, the service relay unit 212 refers to the connection state holding database 220, and acquires connection state information for the extracted terminal ID (Step S1102).

Subsequently, the service relay unit 212 determines whether the acquired connection state information indicates the on-line (Step S1103). If the connection state information does not indicate the on-line at Step S1103, the service relay unit 212 ends the process without relaying the use request to the service 240.

If the connection state information indicates the on-line at Step S1103, the service relay unit 212 relays the use request to the service 240 (Step S1104), and ends the process.

In this manner, in the first embodiment, if connection state information does not indicate the on-line in the server 200, the service relay unit 212 does not relay the use request of service. Accordingly, the first embodiment may suppress generation of an inconsistent operation, such as an operation in which the application 350 makes a use request of service to the service 240 in a state the service-side resource is deallocated in the server 200.

Figure 12:
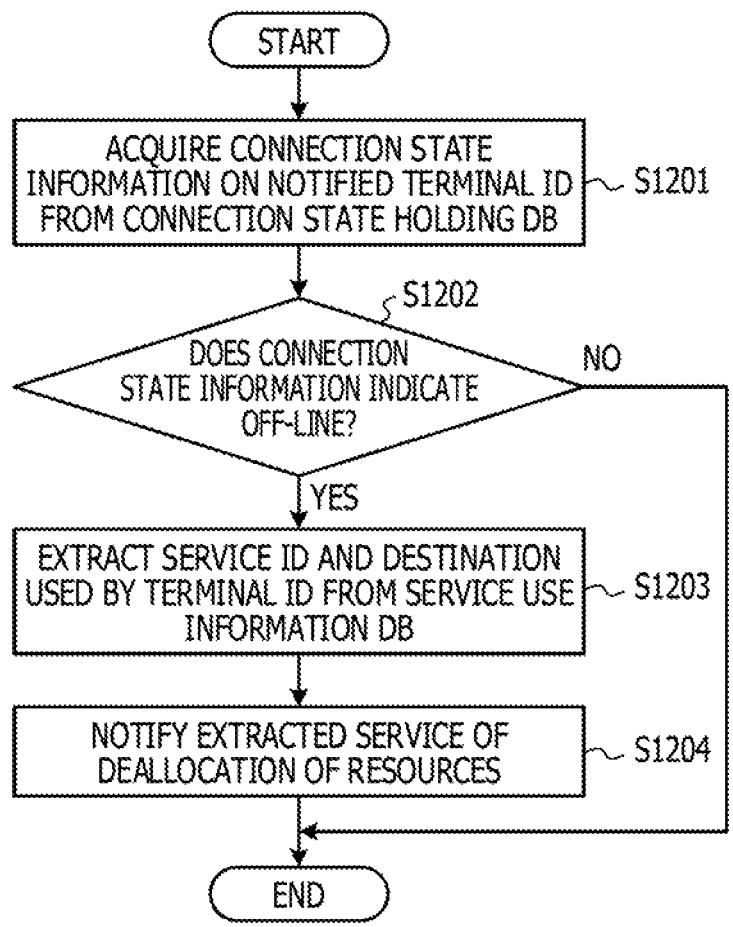
FIG. 12 is a flowchart explaining a process by a service controller of the server in the first embodiment.

Next, with reference to FIG. 12, a process by the service controller 213 of the state monitoring processor 210 in the first embodiment will be described. FIG. 12 is a flowchart explaining a process by a service controller of the server in the first embodiment.

When the service controller 213 in the first embodiment receives a notification of a terminal ID from the server state synchronization unit 214, the service controller 213 refers to the connection state holding database 220, and acquires connection state information on the notified terminal ID (Step S1201). Subsequently, the service controller 213 determines whether the connection state information indicates the off-line (Step S1202).

If the connection state information does not indicate the off-line at Step S1202, in other words, the connection state information indicates the on-line, the service controller 213 ends the process.

If the connection state information indicates the off-line at Step S1202, the service controller 213 refers to the service use information database 230, and extracts a service ID and a service notification destination corresponding to the notified terminal ID (Step S1203). Subsequently, the service controller 213 notifies the service identified by the extracted service ID of the deallocation of resources (Step S1204), and ends the process.

As in the forgoing, when connection state information on the notified terminal ID indicates the off-line, the service controller 213 in the first embodiment causes the service 240 corresponding to the terminal ID to deallocate the service-side resource.

Figure 13:
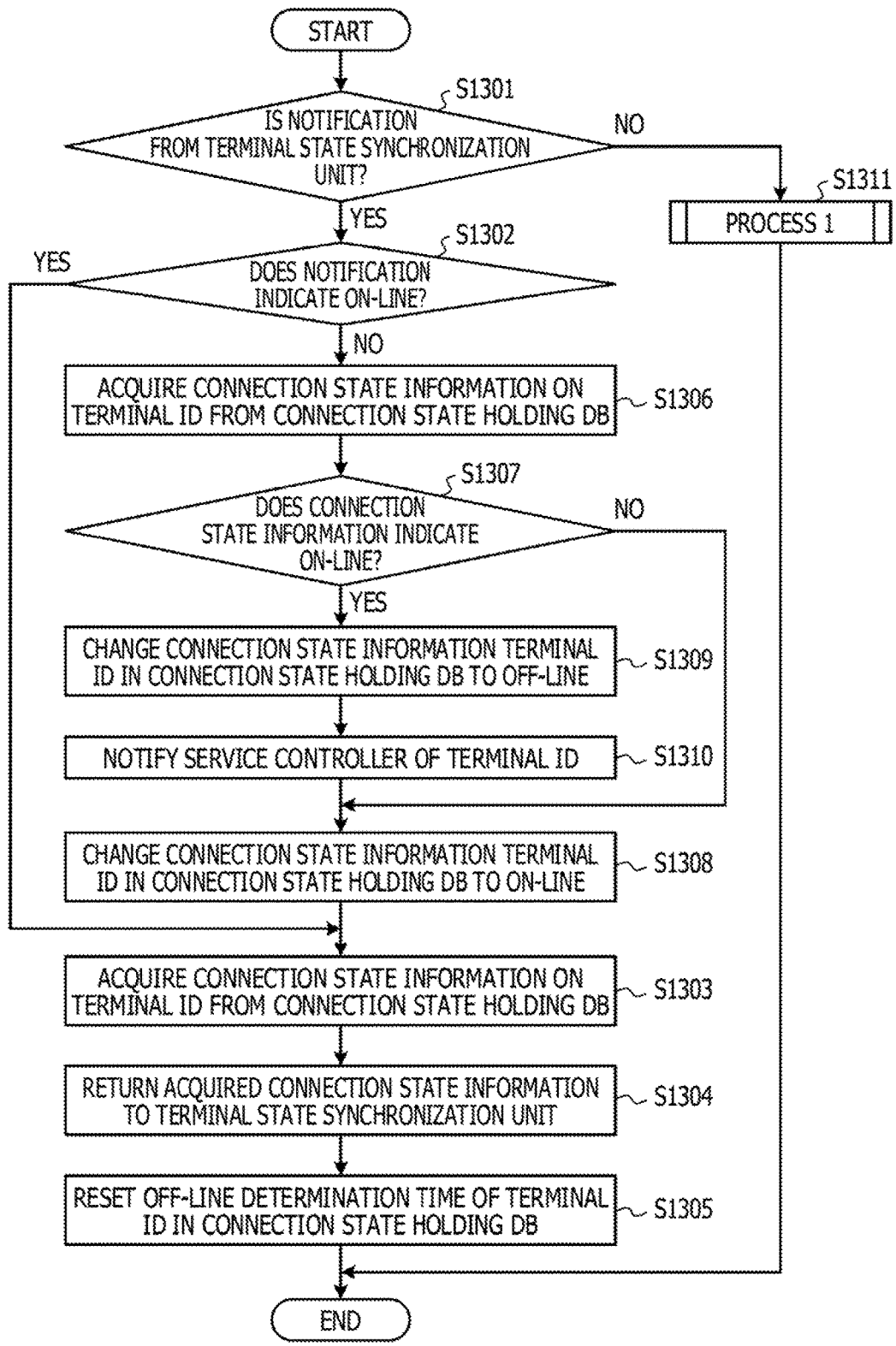
FIG. 13 is a first flowchart explaining a process by a server state synchronization unit of the server in the first embodiment.

Next, with reference to FIG. 13, a process by the server state synchronization unit 214 of the state monitoring processor 210 in the first embodiment will be described. FIG. 13 is a first flowchart explaining a process by a server state synchronization unit of the server in the first embodiment. Noted that the process in FIG. 13 is repeated on a predetermined interval basis. The predetermined interval herein is an interval shorter than the off-line determination time in the connection state holding database 220.

The server state synchronization unit 214 in the first embodiment determines whether a notification is received from the terminal state synchronization unit 313 of the terminal device 300 (Step S1301). In other words, the server state synchronization unit 214 determines whether connection state information is received from the terminal state synchronization unit 313.

If no notification is received at Step S1301, the server state synchronization unit 214 advances the process to Step S1311, which is described later.

If the notification is received Step S1301, the server state synchronization unit 214 determines whether the notification (connection state information) indicates the on-line (Step S1302). Further, the server state synchronization unit 214 receives a terminal ID of the terminal device 300 that has made the notification, with the notification.

If the notification does not indicate the on-line Step S1302, in other words, the connection state information indicates the off-line, the server state synchronization unit 214 advances the process to Step S1306, which is described later.

If the notification indicates the on-line at Step S1302, the server state synchronization unit 214 acquires, from the connection state holding database 220, connection state information for the terminal ID that has been received with the connection state information (Step S1303).

Subsequently, the server state synchronization unit 214 returns the connection state information acquired at Step S1303 to the terminal device 300 (Step S1304). Next, the server state synchronization unit 214 resets the off-line determination time for the received terminal ID in the connection state holding database 220 (Step S1305), and ends the process. In other words, the server synchronization unit 214 restores the off-line determination time of a terminal ID of the terminal device 300 to an initial value at Step S1305, and ends the process.

If the connection state information does not indicate the on-line Step S1302, in other words, indicates the off-line, the server state synchronization unit 214 acquires, from the connection state holding database 220, connection state information for the terminal ID that has been received with the connection state information (Step S1306).

Subsequently, the server state synchronization unit 214 determines whether the connection state information acquired at Step S1306 indicates the on-line (Step S1307).

If the connection state information does not indicate the on-line at Step S1307, in other words, indicates the off-line, the server state synchronization unit 214 changes the connection state information of the terminal ID in the connection state holding database 220 from the off-line to the on-line (Step S1308), and advances the process to Step S1303.

If the connection state information indicates the on-line at Step S1307, the server state synchronization unit 214 changes the connection state information of the terminal ID in the connection state holding database 220 from the on-line to the off-line (Step S1309). Subsequently, the server state synchronization unit 214 notifies the service controller 213 of the terminal ID (Step S1310), and advances the process to Step S1308. Herein, the terminal ID in which the connection state information in the connection state holding database 220 is changed to the off-line is notified to the service controller 213. Therefore, the service controller 213 makes a deallocation instruction of the service-side resource to the service that is identified by a service ID corresponding to the terminal ID in the service use information database 230 (see FIG. 12).

If connection state information is not received from the terminal state synchronization unit 313 at Step S1301, the server state synchronization unit 214 executes a process 1, (Step S1311), and ends the process.

Figure 14:
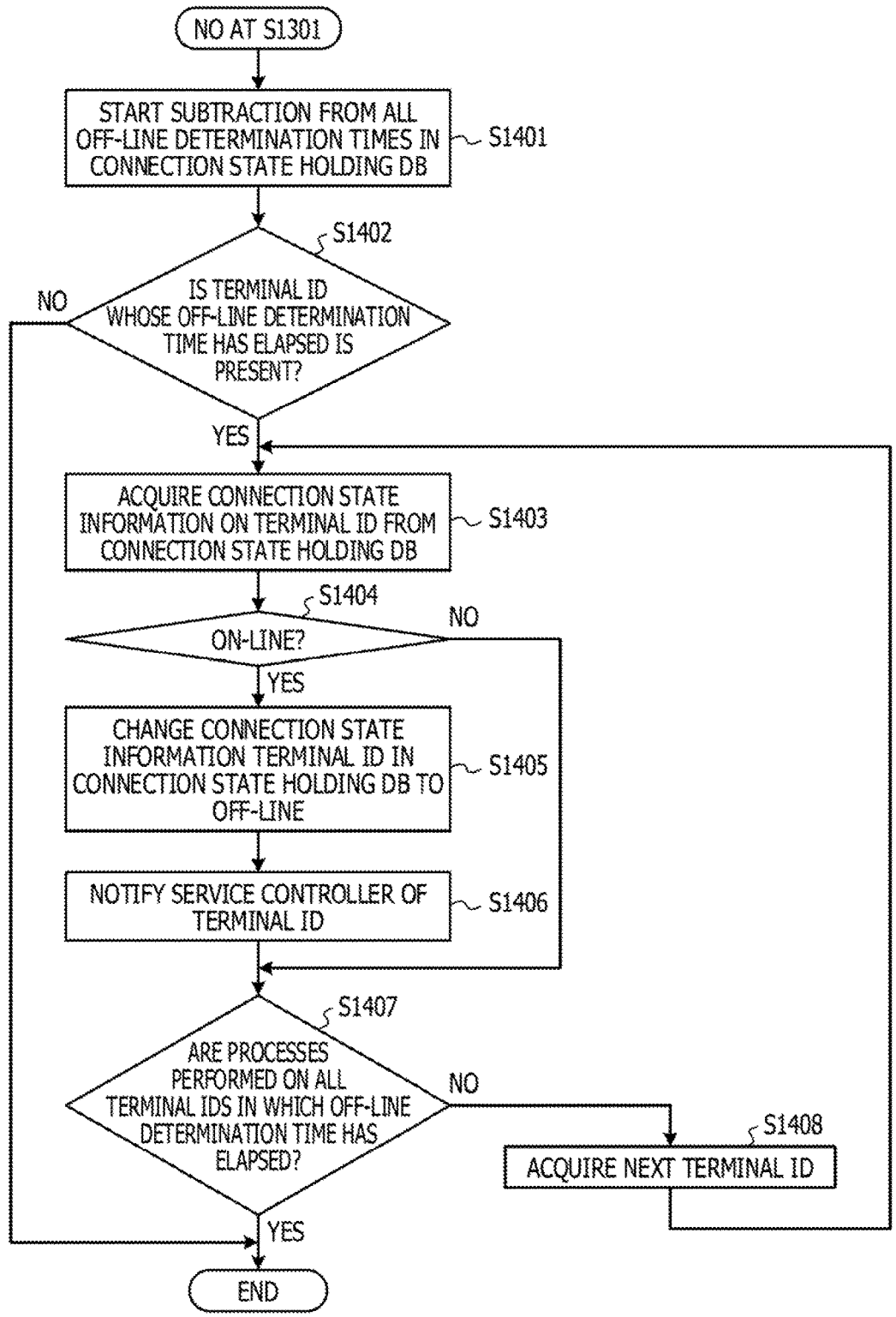
FIG. 14 is a second flowchart explaining a process by the server state synchronization unit of the server in the first embodiment.

Hereinafter, with reference to FIG. 14, the process 1 by the server state synchronization unit 214 of the state monitoring processor 210 will be described. FIG. 14 is a second flowchart explaining a process by the server state synchronization unit of the server in the first embodiment.

If the connection state information is not notified at Step S1301, the server state synchronization unit 214 in the first embodiment starts subtraction from the off-line determination time for each of all the terminal IDs stored in the connection state holding database 220 (Step S1401). Subsequently, the server state synchronization unit 214 determines whether a terminal ID in which the off-line determination time has elapsed is present (Step S1402). In other words, the server state synchronization unit 214 determines whether a terminal ID in which the off-line determination time becomes 0 or less, as a result of the subtraction of the off-line determination time, and the communication with the server 200 being disconnected is determined is present.

If such terminal ID is not present Step S1402, the server state synchronization unit 214 ends the process.

If such terminal ID is present at Step S1402, the server state synchronization unit 214 acquires the connection state information of the terminal ID from the connection state holding database 220 (Step S1403). Subsequently, the server state synchronization unit 214 determines whether the acquired connection state information indicates the on-line (Step S1404).

If the connection state information does not indicate the on-line at Step S1404, in other words, indicates the off-line, the server state synchronization unit 214 advances the process to Step S1407, which is described later.

If the connection state information indicates the on-line at Step S1404, the server state synchronization unit 214 changes the connection state information of the terminal ID in the connection state holding database 220 from the on-line to the off-line (Step S1405). Subsequently, the server state synchronization unit 214 notifies the service controller 213 of the terminal ID (Step S1406), and advances the process to Step S1407.

Further, the service controller 213 that has received the notification of a terminal ID at Step S1406 performs the processes at Step S1203 and subsequent Steps in FIG. 12, and causes the service used by the terminal device of the terminal ID to deallocate the service-side resource.

If the connection state information indicates the off-line at Step S1404, the server state synchronization unit 214 determines whether the processes at Step S1403 and subsequent Steps are performed for all the terminal IDs in which the off-line determination time has elapsed (Step S1407). In other words, as for the terminal device 300 in which the communication with the server 200 is disconnected, the server state synchronization unit 214 determines whether the service-side resource of the service used by the terminal device 300 is caused to deallocate.

If the processes for all the terminal IDs are determined as not performed at Step S1407, the server state synchronization unit 214 acquires a next terminal ID in which the off-line determination time has elapsed (Step S1408), and returns the process to Step S1403.

If the processes at Step S1403 and subsequent Steps are performed for all the terminal IDs in which the off-line determination time has elapsed at Step S1407, the server state synchronization unit 214 ends the process.

The foregoing describes the processes in the respective units included in the state monitoring processor 210 of the server 200 in the first embodiment.

Next, the processes in the respective units included in the state monitoring processor 310 of the terminal device 300 in the first embodiment will be described.

Figure 15:
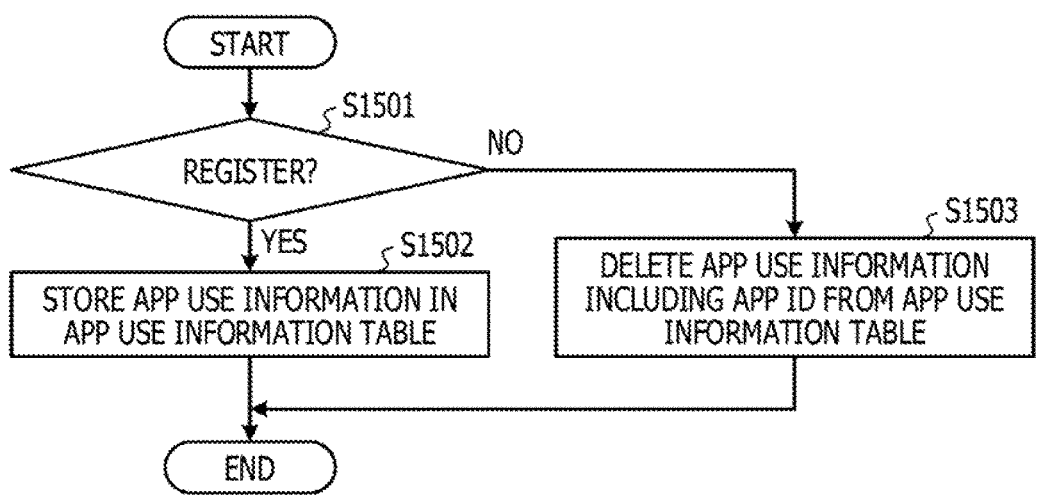
FIG. 15 is a flowchart explaining a process by an app registration unit of the terminal device in the first embodiment.

FIG. 15 is a flowchart explaining a process by an app registration unit of the terminal device in the first embodiment.

The app registration unit 311 included in the state monitoring processor 310 of the terminal device 300 in the first embodiment is requested from the application 350 to register or delete app use information for making a notification of a service available time and unavailable time, and manages the app use information. When the app registration unit 311 receives a request from the application 350, and determines whether the request indicates that the app use information is registered (Step S1501). For the application 350, the app use information for all services to be used may be registered when the operation is started, and then be deleted when the app is ended, or the app use information for each service may be registered when the service is used, and be deleted when the use of the service is ended.

When app use information is registered at Step S1501, the app registration unit 311 stores the app use information from the application 350 in the app use information table 330 (Step S1502), and ends the process. The app use information is information that includes items of "app ID", "notification destination", and "service ID list".

If the request does not indicate that the app use information is registered at Step S1501, in other words, that the app use information is deleted, the app registration unit 311 deletes the app use information including the app ID from the app use information table 330 (Step S1503), and ends the process.

In the first embodiment, the process by the app registration unit 311 in the foregoing stores the service ID of the service that is used by the running application in the app use information table 330.

Figure 16:
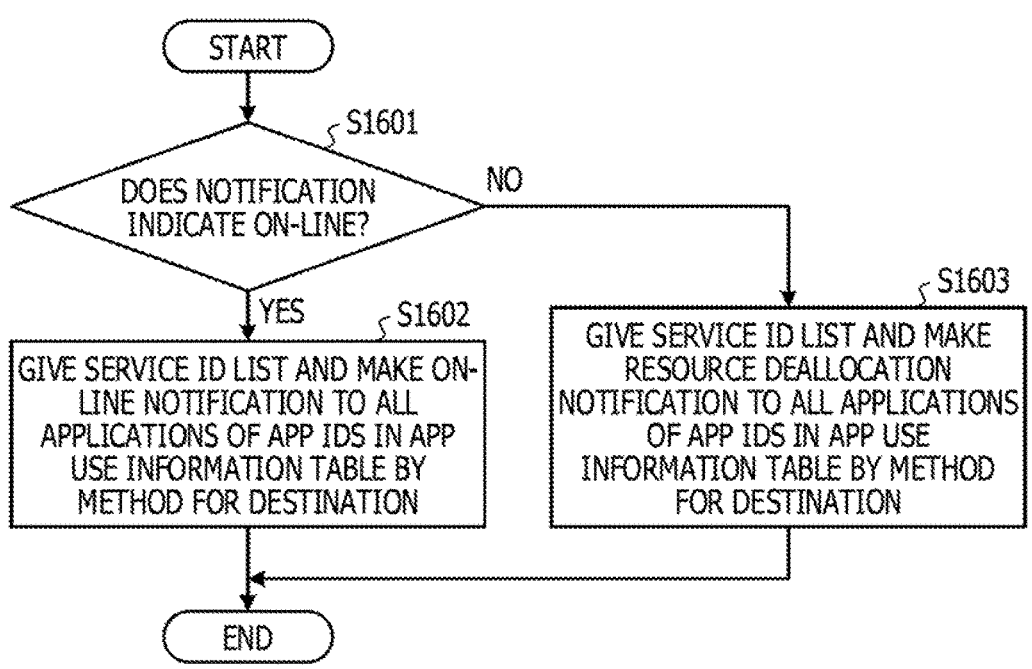
FIG. 16 is a flowchart explaining a process by an app controller of the terminal device in the first embodiment.

Next, with reference to FIG. 16, a process by the app controller 312 included in the state monitoring processor 310 of the terminal device 300 in the first embodiment will be described. FIG. 16 is a flowchart explaining a process by an app controller of the terminal device in the first embodiment.

The app controller 312 in the first embodiment determines whether connection state information notified from the terminal state synchronization unit 313 indicates the on-line (Step S1601). If the connection state information indicates the on-line at Step S1601, the app controller 312 makes an on-line notification to each of the applications 350 identified by all the app IDs included in the app use information table 330 in accordance with a method indicated by a destination for the corresponding app ID (Step S1602), and ends the process.

In this Step, the app controller 312 gives the application 350 identified by each app ID the service ID list for the app ID and makes an on-line notification to the application 350. In other words, the app controller 312 instructs the application 350 identified by each app ID to start the use of service identified by the service ID included in the service ID list.

If the connection state information does not indicate the on-line at Step S1601, the app controller 312 makes a deallocation instruction of the terminal-side resource to each of the applications 350 identified by all the app IDs included in the app use information table 330 in accordance with a method indicated by a destination for the corresponding app ID (Step S1603), and ends the process.

In this time, the app controller 312 gives the application 350 identified by each app ID the service ID list for the app ID, and makes a deallocation instruction of the terminal-side resource to the application 350. In other words, the app controller 312 instructs the application 350 identified by each app ID to deallocate resources that have been used for the service identified by the service ID included in the service ID list.

Figure 17:
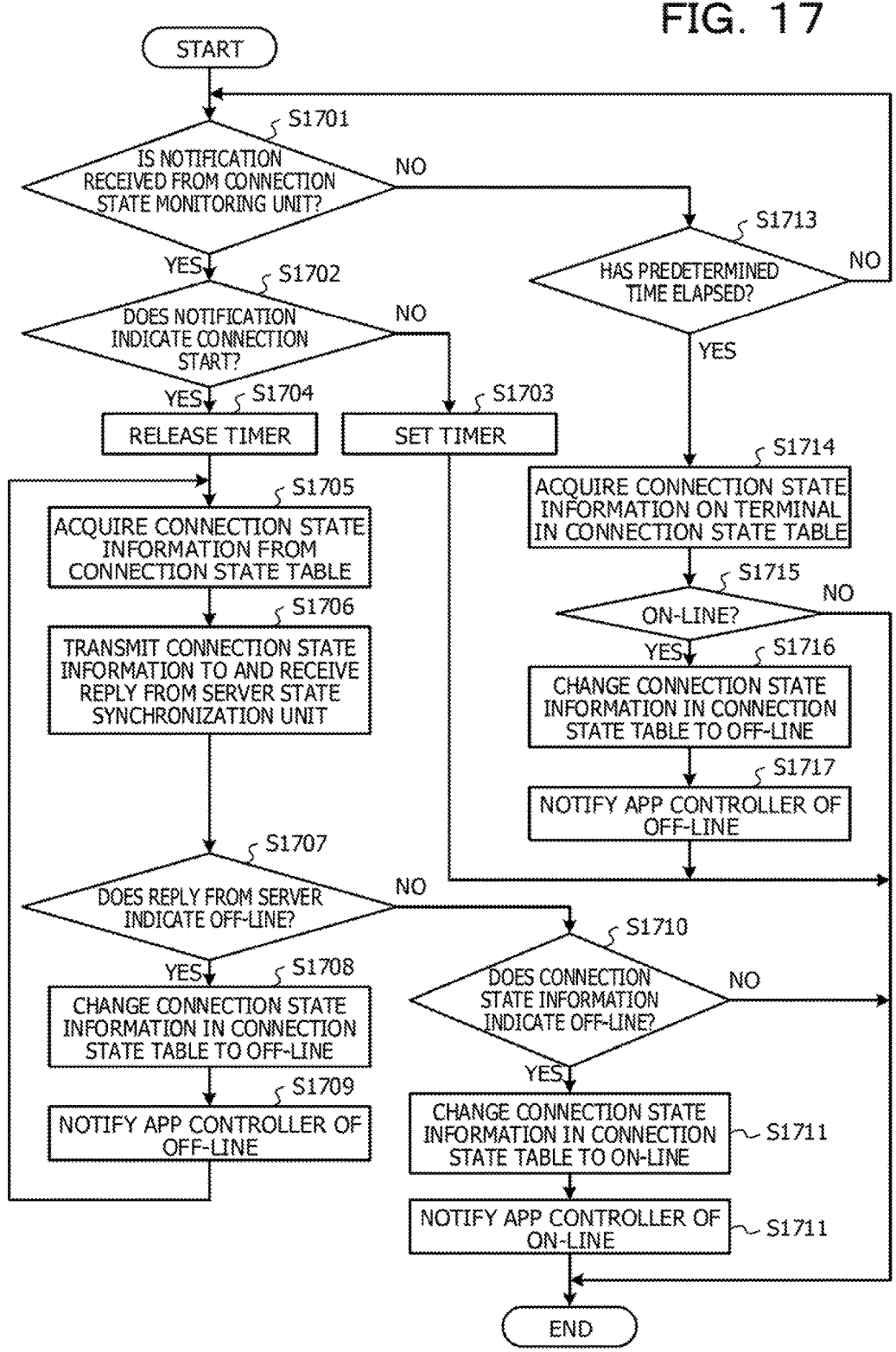
FIG. 17 is a flowchart explaining a process by a terminal state synchronization unit included in the terminal device in the first embodiment.

Next, with reference to FIG. 17, a process by the terminal state synchronization unit 313 of the state monitoring processor 310 included in the terminal device 300 in the first embodiment will be described. FIG. 17 is a flowchart explaining a process by a terminal state synchronization unit included in the terminal device in the first embodiment.

The terminal state synchronization unit 313 in the first embodiment determines whether a notification indicating a state of communication between the terminal device 300 and the server 200 is received from the connection state monitoring unit 340 (Step S1701).

If no notification is received at Step S1701, the terminal state synchronization unit 313 advances the process to Step S1713, which is described later.

If the notification is received at Step S1701, the terminal state synchronization unit 313 determines whether the notification indicates a start of connection (Step S1702). The notification indicating a start of connection is, for example, a notification indicating that the terminal device 300 acquires an IP address from the access point 20.

If the notification does not indicate a start of connection at Step S1702, in other words, the notification indicates an end of connection, the terminal state synchronization unit 313 sets a timer using a timer function included in the terminal device 300 (Step S1703), and ends the process. A period set herein on the timer matches the off-line determination time in the connection state holding database 220. The period set on the timer at Step S1703 is a period for which the terminal device 300 determines that the communication between the terminal device 300 and the server 200 is disconnected.

If the notification indicates a start of connection at Step S1702, the terminal state synchronization unit 313 releases the timer setting (Step S1704).

Subsequently, the terminal state synchronization unit 313 acquires connection state information on the terminal device 300 from the connection state table 320 (Step S1705). Subsequently, the terminal state synchronization unit 313 transmits the connection state information acquired at Step S1705 to the server state synchronization unit 214 of the server 200, and receives a reply from the server state synchronization unit 214 (Step S1706).

Subsequently, the terminal state synchronization unit 313 determines whether the connection state information having received from the server state synchronization unit 214 as the reply indicates the off-line (Step S1707).

If the connection state information does not indicate the off-line at Step S1707, in other words, indicates the on-line, the terminal state synchronization unit 313 advances the process to Step S1710, which is described later.

If the connection state information indicates the off-line at Step S1707, the terminal state synchronization unit 313 changes connection state information in the connection state table 320 to the off-line (Step S1708). Subsequently, the terminal state synchronization unit 313 notifies the app controller 312 of the connection state information indicating the off-line (Step S1709), and returns the process to Step S1705. In this time, when the app controller 312 receives the notification indicating the off-line, the app controller 312 makes a deallocation instruction of the terminal-side resource that has been used by the application 350 for using the service to the application 350.

If the connection state information indicates the on-line at Step S1707, the terminal state synchronization unit 313 determines whether the connection state information acquired from the connection state table 320 at Step S1705 indicates the off-line (Step S1710).

If the connection state information does not indicate the off-line at Step S1710, in other words, indicates the off-line, the terminal state synchronization unit 313 ends the process.

If the connection state information indicates the off-line at Step S1710, the terminal state synchronization unit 313 changes connection state information in the connection state table 320 from the off-line to the on-line (Step S1711). Subsequently, the terminal state synchronization unit 313 notifies the app controller 312 of the connection state information indicating the on-line (Step S1712), and ends the process. In this time, when the app controller 312 receives the notification indicating the on-line, the app controller 312 instructs the application 350 to start the use of the service. Moreover, when the application 350 receives the notification indicating the on-line from the app controller 312, the application 350 makes a use request (access) to the service 240.

In this manner, in the first embodiment, in a state where connection state information in the connection state holding database 220 of the server 200 and connection state information in the connection state table 320 of the terminal device 300 are synchronized as the on-line, the on-line is notified to the app controller 312.

In other words, in the first embodiment, connection state information on the terminal device 300 is not changed to the on-line before connection state information in the server 200 side is changed to the on-line from when the start of connection is notified in the terminal device 300, to delay the notification indicating the on-line to the app controller 132.

Accordingly, the first embodiment may suppress the application 350 from accessing the service 240 in a state where the service-side resource is deallocated.

If no notification is received at Step S1701, the terminal state synchronization unit 313 determines whether a predetermined time has elapsed (Step S1713). The predetermined time at Step S1713 is the time set on the timer. Therefore, in other words, the terminal state synchronization unit 313 determines whether the off-line determination time has elapsed at Step S1713.

If the predetermined time has not elapsed at Step S1713, the terminal state synchronization unit 313 returns the process to Step S1701.

If the predetermined time has elapsed at Step S1713, the terminal state synchronization unit 313 acquires connection state information from the connection state table 320 (Step S1714). Subsequently, the terminal state synchronization unit 313 determines whether the acquired connection state information indicates the on-line (Step S1715).

If the connection state information does not indicate the on-line at Step S1715, in other words, indicates the off-line, the terminal state synchronization unit 313 ends the process.

If the connection state information indicates the on-line at Step S1715, the terminal state synchronization unit 313 changes connection state information in the connection state table 320 from the on-line to the off-line (Step S1716). Subsequently, the terminal state synchronization unit 313 notifies the app controller 312 of the connection state information indicating the off-line (Step S1717), and ends the process. In this time, when the app controller 312 receives the notification indicating the off-line, the app controller 312 makes a deallocation instruction of the terminal-side resource that has been used for using the service to the application 350.

In the first embodiment, the processes explained in the foregoing in the server 200 and the terminal device 300 implement the respective operations illustrated in FIGS. 2(A) and 2(B) and FIGS. 3A, 3B, and 3C.

Accordingly, with the first embodiment, an increase in load due to the resource checking process may be suppressed. Moreover, in a case where connection state information on the server 200 and connection state information on the terminal device 300 are not synchronized as the on-line, even when the service relay unit 212 in the first embodiment receives a use request of service from the application 350, the service relay unit 212 does not notify the service 240 of the use request. Accordingly, the first embodiment may suppress generation of an inconsistent operation or the like, which is generated because the use request is notified from the application 350 in a state where the service-side resource is not allocated in the server 200.

(Second Embodiment)

A second embodiment will be described below with reference to the drawings. The second embodiment is different from the first embodiment in that when a use request from an application to a service is not relayed, a service unavailable notification is made. Therefore, only the differences from the first embodiment will be explained in the following explanation of the second embodiment, the elements having the function configuration similar to those in the first embodiment are assigned with the similar reference numerals used in the explanation of the first embodiment, and explanations thereof are omitted.

Figure 18:
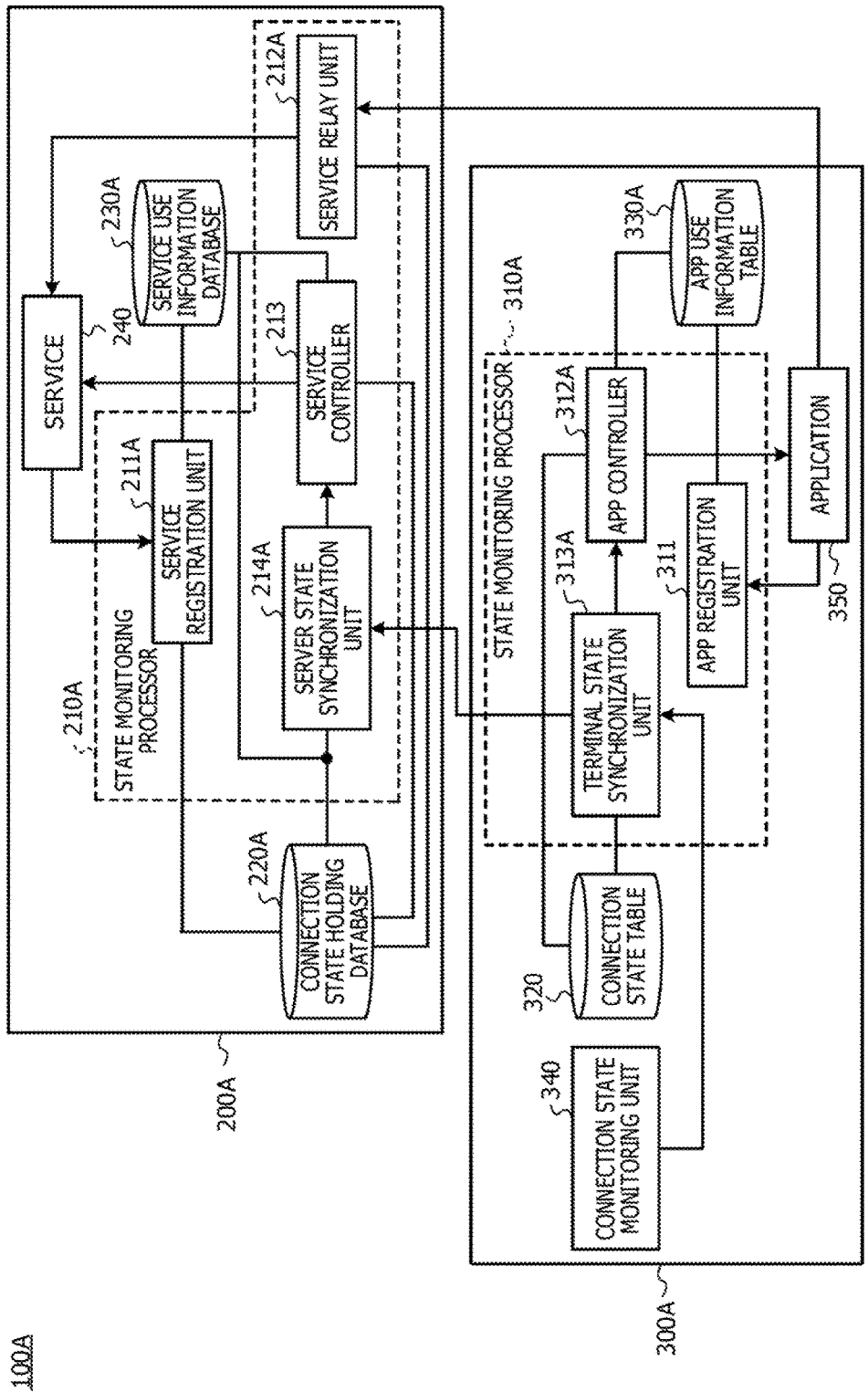
FIG. 18 is a diagram explaining functions of respective devices included in an information processing system according to a second embodiment.

FIG. 18 is a diagram explaining functions of respective devices included in an information processing system in the second embodiment.

An information processing system 100A in the second embodiment includes a server 200A and a terminal device 300A.

The server 200A in the second embodiment includes a state monitoring processor 210A, a connection state holding database 220A, and a service use information database 230A.

The connection state holding database 220A and the service use information database 230A in the second embodiment each store therein information indicating whether the service 240 is available. Details of the connection state holding database 220A and the service use information database 230A will be described later.

The state monitoring processor 210A in the second embodiment includes a service registration unit 211A, a service relay unit 212A, the service controller 213, and a server state synchronization unit 214A.

The service registration unit 211A registers information indicating whether the service 240 is available in the service use information database 230A.

If the service 240 is unavailable, the service relay unit 212A transmits a notification indicating that the service 240 is unavailable to the terminal device 300A. In the following explanation, the notification indicating that the service 240 is unavailable is called service unavailable notification.

The server state synchronization unit 214A updates information in the connection state holding database 220A based on the service unavailable notification.

The terminal device 300A in the second embodiment includes a state monitoring processor 310A, the connection state table 320, and an app use information table 330A.

The app use information table 330A in the second embodiment stores therein information indicating whether the service 240 is available. A detail of the app use information table 330A will be described later.

The state monitoring processor 310A in the second embodiment includes the app registration unit 311, an app controller 312A, and a terminal state synchronization unit 313A.

When the terminal state synchronization unit 313A receives a service unavailable notification is received from the server 200A, the app controller 312A makes the use of the service that is determined as unavailable service for the application 350 impossible, and updates information in the app use information table 330A.

When the terminal state synchronization unit 313A in the second embodiment accepts an unavailable service ID list from the server 200A, the terminal state synchronization unit 313A passes the unavailable service ID list to the app controller 312A.

Next, with reference to FIGS. 19 and 20, respective databases included in the server 200A in the second embodiment will be described.

FIG. 19 is a table illustrating an example of a connection state holding database in the second embodiment. The connection state holding database 220A in the second embodiment includes, as items of information, a terminal ID, a connection state, an off-line determination time, and an unavailable service ID list.

A value of the item "unavailable service ID list" indicates an identifier that identifies the service 240 unusable by the terminal device 300A identified by an associated terminal ID.

In the example of FIG. 19, it may be understood that the terminal device 300A of a terminal ID "001" is unable to use the service 240 of the service IDs "1001" and "1002".

FIG. 20 is a table illustrating an example of a service use information database in the second embodiment. The service use information database 230A in the second embodiment includes, as items of information, a service ID, a service notification destination, a service state, and a terminal ID list.

A value of the item "service state" indicates the use propriety of the service 240 identified by an associated service ID. Further, in the second embodiment, when the service registration unit 211A receives a notification indicating that the use becomes possible from the service 240 in which the value of the item "service state" is unavailable, the value of the item "service state" is updated from unavailable to available.

In the example of FIG. 20, it may be understood that the service 240 of a service ID "1001" is unavailable, and the terminal devices 300A of terminal IDs "001" and "002" use the service 240.

Next, with reference to FIG. 21, the app use information table 330A included in the terminal device 300A in the second embodiment will be described.

FIG. 21 is a table illustrating an example of an app use information table in the second embodiment. The app use information table 330A in the second embodiment includes, as items of information, an app ID, a notification destination, and a service ID list/service state.

A value of the item "service ID list/service state" indicates a service ID of the service 240 used by an app ID and the use propriety of the service 240 identified by the service ID.

In the example of FIG. 21, an app ID "11" uses the service 240 of a service ID "1001" and the service 240 of a service ID "1002", and both of the service 240 identified by the service ID "1001" and the service 240 identified by the service ID "002" are unavailable.

Figure 22:
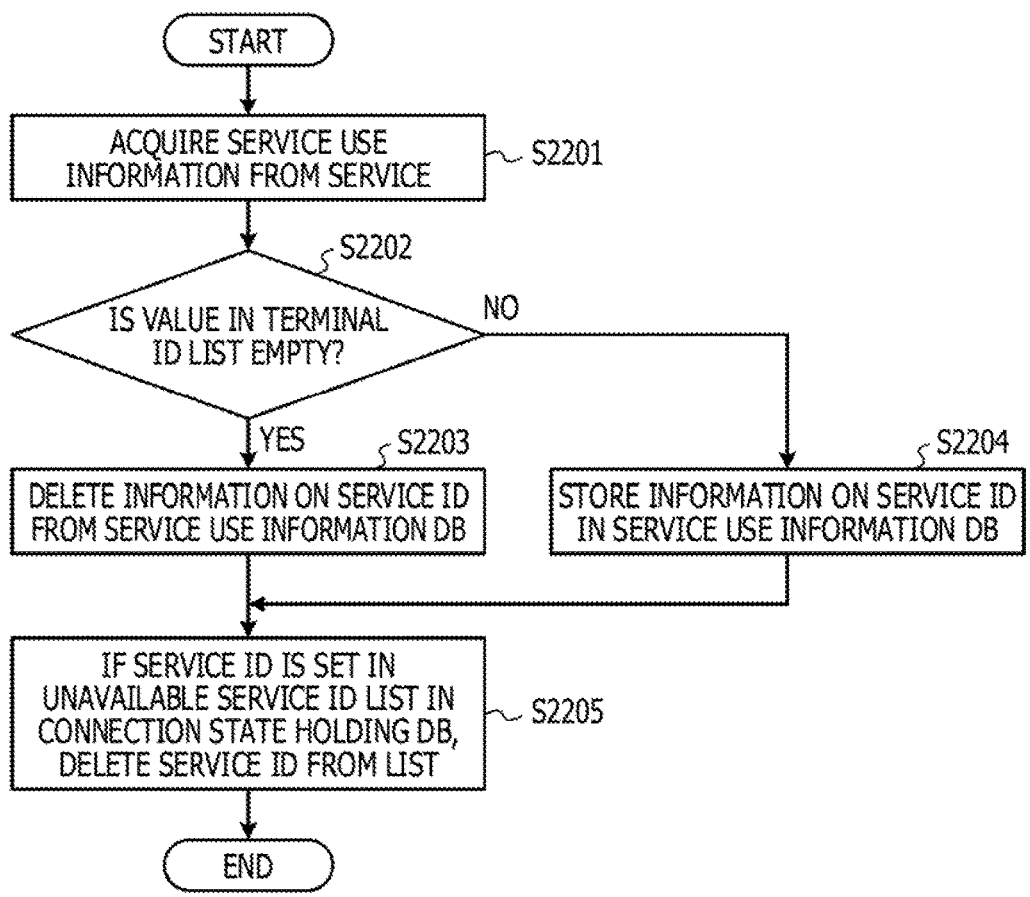
FIG. 22 is a flowchart explaining a process by a service registration unit of a server in the second embodiment.

Next, operations in the server 200A and the terminal device 300A in the second embodiment will be described. FIG. 22 is a flowchart explaining a process by a service registration unit of the server in the second embodiment.

The processes from Step S2201 to Step S2204 in FIG. 22 are similar to the processes from Step S1001 to Step S1004 in FIG. 10, and thus explanations thereof are omitted.

Subsequent to Step S2203 or Step S2204, the service registration unit 211A deletes the target service ID from the unavailable service ID lists in connection state information of all the terminal IDs in the connection state holding database 220A (Step S2205), and ends the process.

Next, a process by the service relay unit 212A included in the state monitoring processor 210A of the server 200A in the second embodiment will be described.

Figure 23:
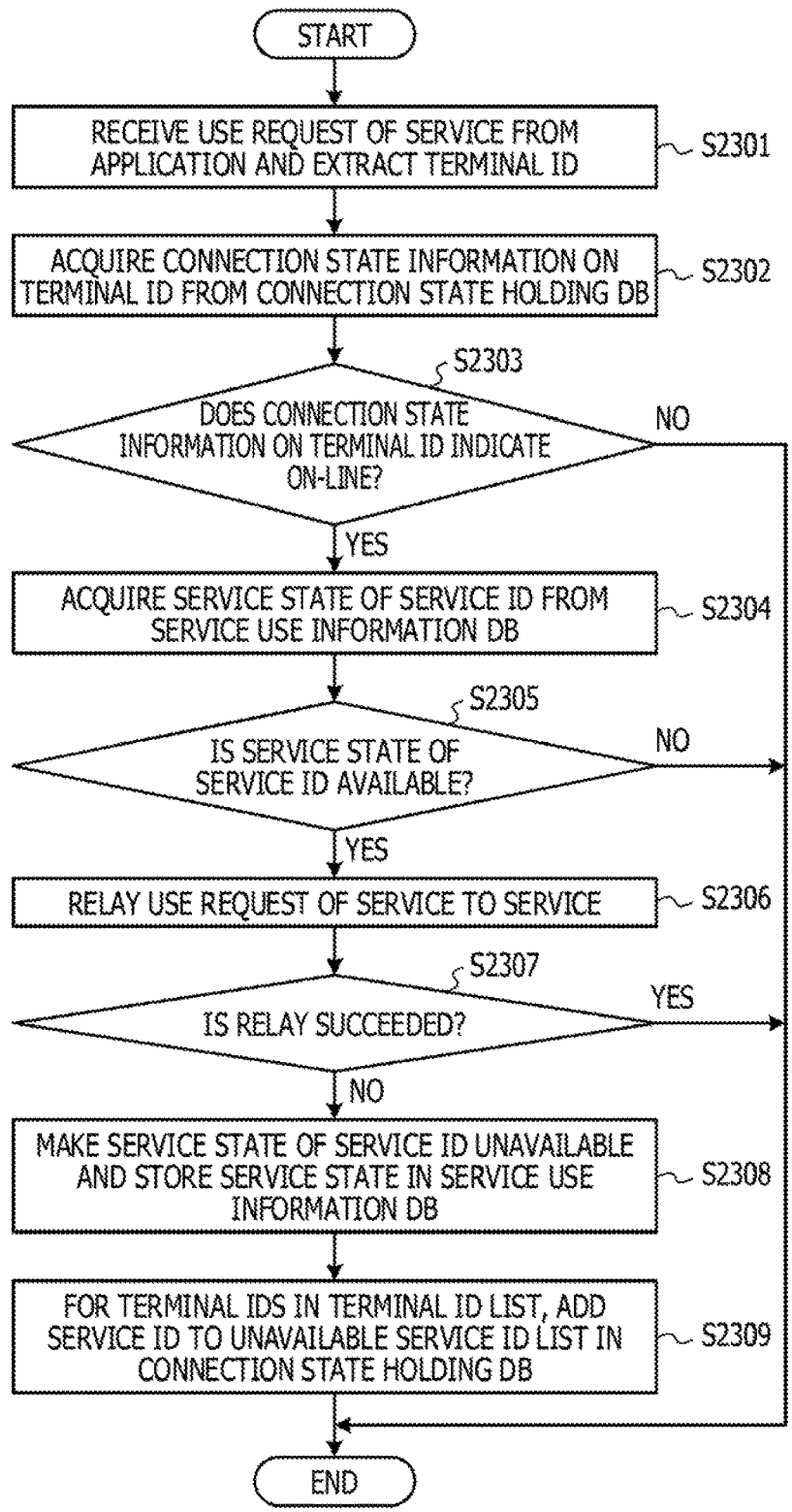
FIG. 23 is a flowchart explaining a process by a service relay unit of the server in the second embodiment.

FIG. 23 is a flowchart explaining a process by a service relay unit of the server in the second embodiment.

The processes from Step S2301 to Step S2303 in FIG. 23 are similar to the processes from Step S1101 to Step S1103 in FIG. 11, and thus explanations thereof are omitted.

If the connection state information does not indicate the on-line at Step S2303, the service relay unit 212A ends the process without relaying the use request to the service 240.

If the connection state information indicates the on-line at Step S2303, the service relay unit 212A acquires a service state of a service ID that receives the use request in the service use information database 230A (Step S2304).

Subsequently, the service relay unit 212A determines whether the service state is available (Step S2305). If the service state is not available at Step S2305, in other words, the service state is unavailable, the service relay unit 212A ends the process without relaying the use request of service.

If the service state is available at Step S2305, the service relay unit 212A relays the use request of service to the service 240 (Step S2306).

Subsequently, the service relay unit 212A determines whether the relay to the service 240 is succeeded (Step S2307). If the relay is succeeded at Step S2307, the service relay unit 212A ends the process.

If the relay is failed at Step S2307, the service relay unit 212A makes a service state of a service ID of the service the relay of which is failed unavailable in the service use information database 230A (Step S2308).

Subsequently, for each of terminal IDs in the terminal ID list in the service use information of the service ID, the service relay unit 212A adds a service ID of the service the relay of which is failed to the corresponding unavailable service ID list in the connection state holding database 220A (Step S2309), and ends the process.

Next, a process by the server state synchronization unit 214A included in the state monitoring processor 210A of the server 200A in the second embodiment will be described.

Figure 24:
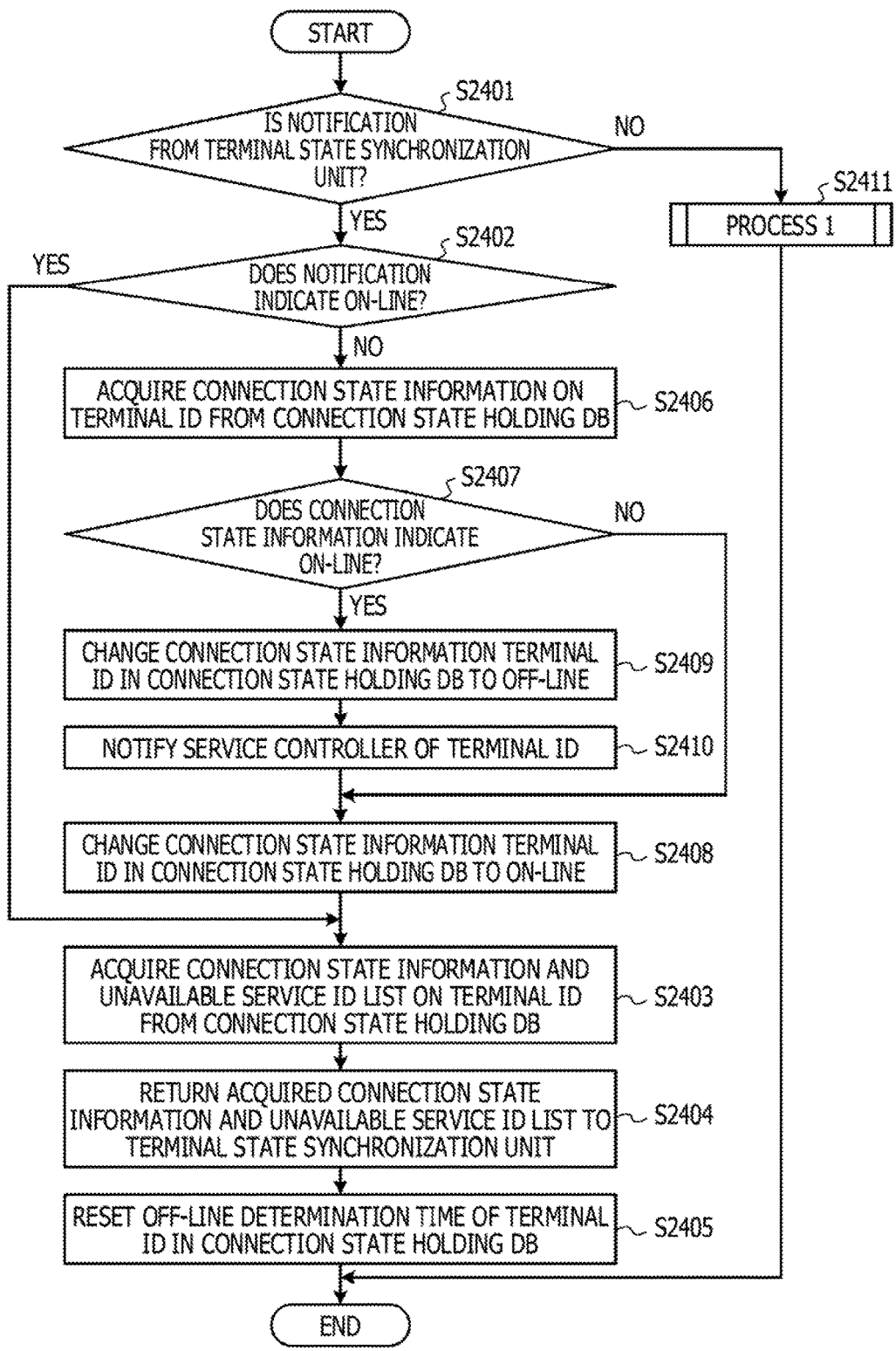
FIG. 24 is a flowchart explaining a process by a server state synchronization unit of the server in the second embodiment.

FIG. 24 is a flowchart explaining a process by a server state synchronization unit of the server in the second embodiment.

The processes from Step S2401 and Step S2402 in FIG. 24 are similar to the processes from Step S1301 and Step S1302 in FIG. 13, and thus explanations thereof are omitted.

If the notification indicates the on-line at Step S2402, the server state synchronization unit 214A acquires, from the connection state holding database 220A, connection state information and an unavailable service ID list for the terminal ID that has been received with the connection state information (Step S2403).

Subsequently, the server state synchronization unit 214A returns the connection state information and the unavailable service ID list acquired at Step S2403 to the terminal device 300A (Step S2404).

The processes from Step S2405 to Step S2411 in FIG. 24 are similar to the processes from Step S1305 to Step S1311 in FIG. 13, and thus explanations thereof are omitted.

Next, a process by the app controller 312A included the state monitoring processor 310A of the terminal device 300A in the second embodiment will be described.

Figure 25:
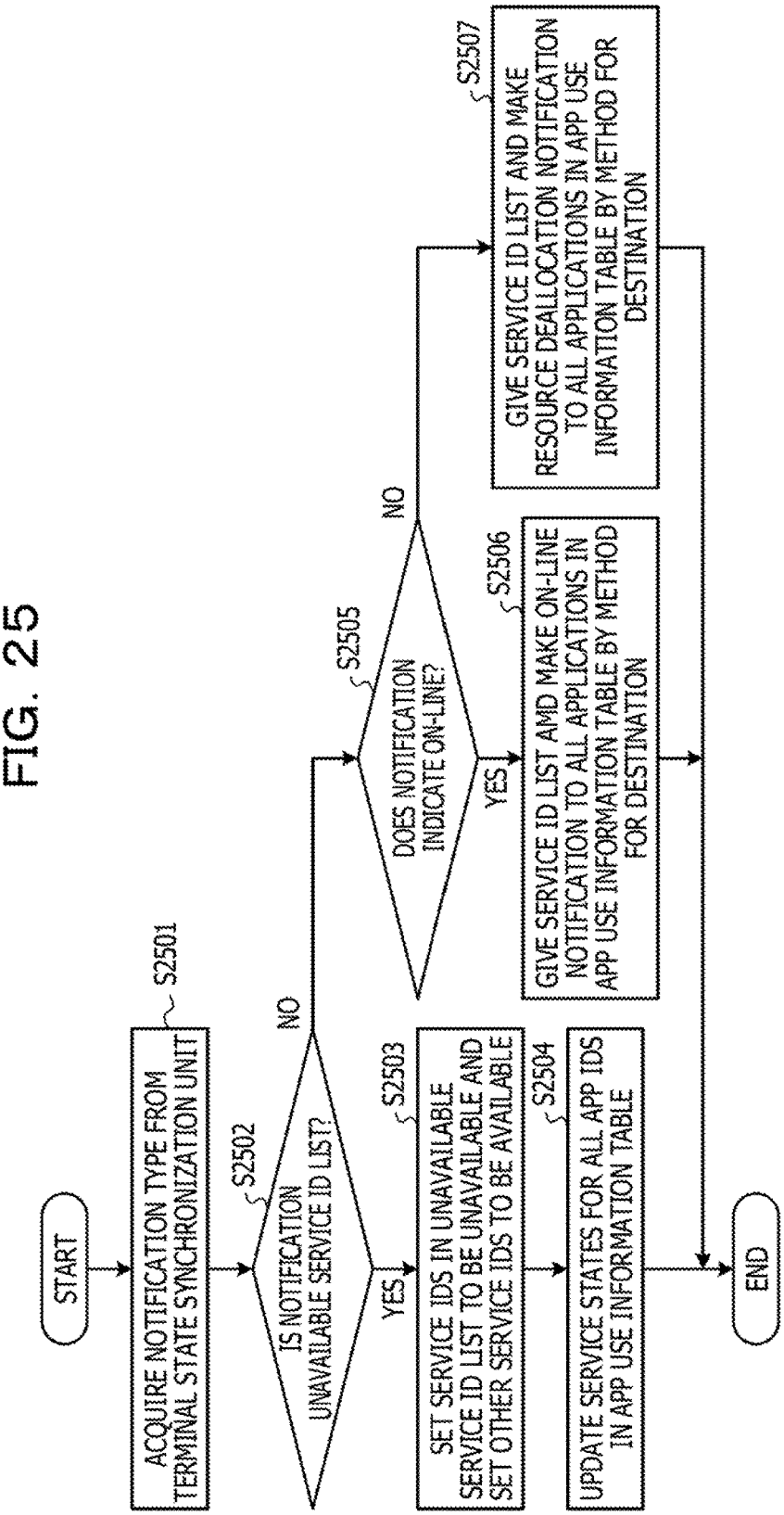
FIG. 25 is a flowchart explaining a process by an app controller of the server in the second embodiment.

FIG. 25 is a flowchart explaining a process by an app controller of the server in the second embodiment.

The app controller 312A in the second embodiment acquires information indicating a type of notification received from the terminal state synchronization unit 313A (Step S2501). Subsequently, the app controller 312A determines whether the content of the notification is an unavailable service ID list based on the information indicating the type (Step S2502).

If the notification is not an unavailable service ID list at Step S2502, the app controller 312A advances the process to Step S2505, which is described later.

If the notification is an unavailable service ID list at Step S2502, the app controller 312A notifies the application 350 of the service being unavailable identified by a service ID included in the unavailable service ID list. Subsequently, the app controller 312A makes the service other than the unavailable service other than service available, and notifies the application 350 of the service being available (Step S2503).

In the second embodiment, in order to reduce the number of notifications to the application 350, when an service ID included in the notified unavailable service list indicates the service state being available in the app use information table, a service unavailable notification may be made, and when an service ID not included in the notified unavailable service list indicates the service state being unavailable in the app use information table, a service available notification may be made.

Subsequently, the app controller 312A updates the corresponding service ID list/service states of all the app IDs in the app use information table 330A (Step S2504), and ends the process.

The processes from Step S2505 to Step S2507 in FIG. 25 are similar to the processes from Step S1601 to Step S1603 in FIG. 16, and thus explanations thereof are omitted.

Next, with reference to FIG. 26, a process by the terminal state synchronization unit 313A included in the state monitoring processor 310A of the terminal device 300A in the second embodiment will be described.

Figure 26:
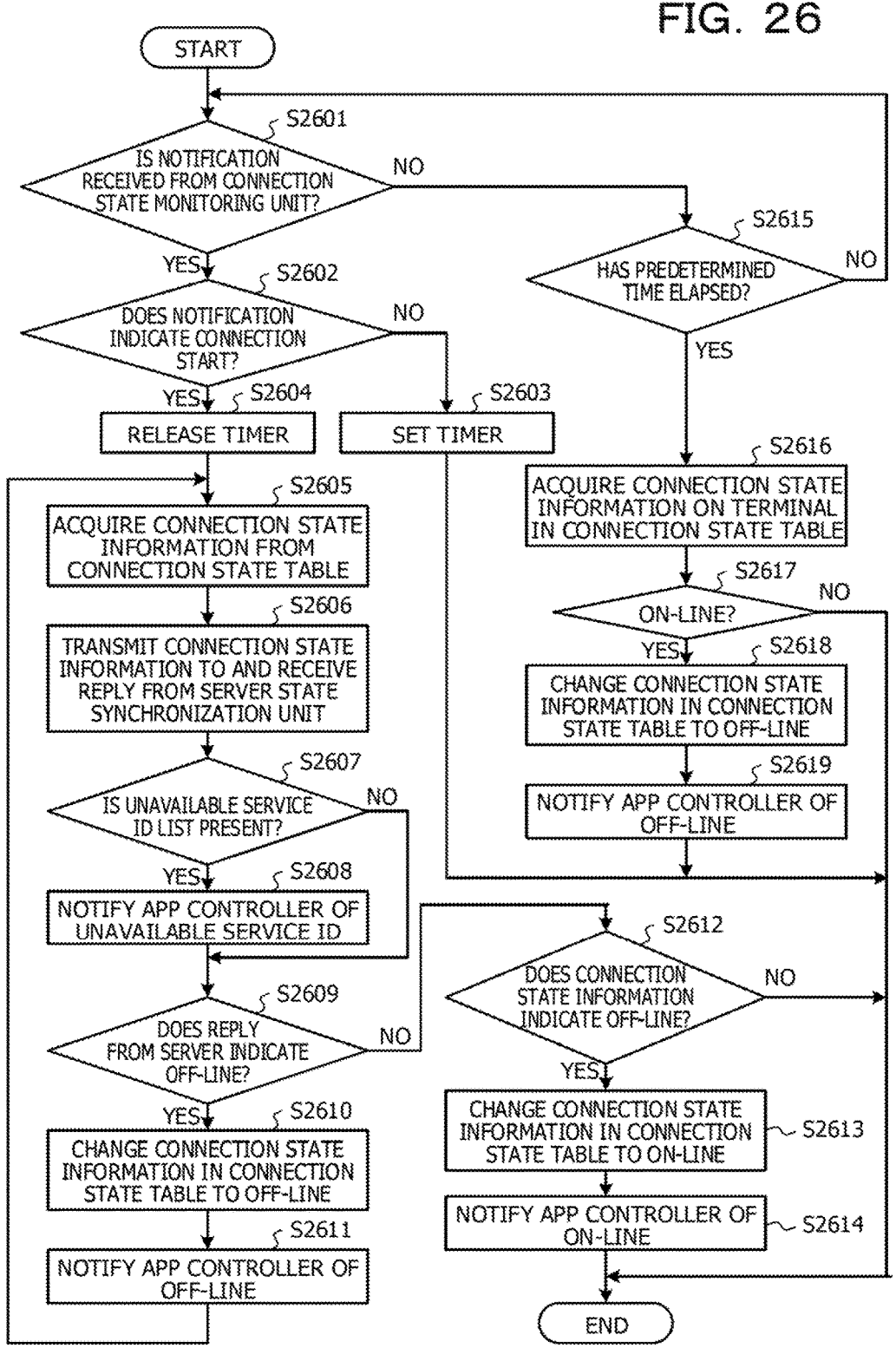
FIG. 26 is a flowchart explaining a process by a terminal state synchronization unit in the terminal device in the second embodiment.

FIG. 26 is a flowchart explaining a process by a terminal state synchronization unit in the terminal device in the second embodiment.

The processes from Step S2601 to Step S2606 in FIG. 26 are similar to the processes from Step S1701 to Step S1706 in FIG. 17, and thus explanations thereof are omitted.

Subsequent to Step S2606, the terminal state synchronization unit 313A determines whether an unavailable service ID list included in the reply from the server 200A is present (Step S2607). In other words, the terminal state synchronization unit 313A determines whether a service ID is present in the unavailable service ID list included in the reply from the server 200A.

If no unavailable service ID list is present at Step S2607, the terminal state synchronization unit 313A advances the process to Step S2609, which is described later.

If the unavailable service ID list is present at Step S2607, the terminal state synchronization unit 313A notifies the app controller 312A of the service ID included in the unavailable service ID list (Step S2608), and advances the process to Step S2609, which is described later.

The processes from Step S2609 to Step S2619 in FIG. 26 are similar to the processes from Step S1707 to Step S1717 in FIG. 17, and thus explanations thereof are omitted.

As in the forgoing, with the second embodiment, it is possible to notify the application 350 of information indicating whether the service 240 is available, together with synchronization between connection state information in the server 200A and connection state information in the terminal device 300A.

(Third Embodiment)

A third embodiment will be described below with reference to the drawings. The third embodiment is different from the first embodiment only in that a server provides an state monitor application that implements a state monitoring processor to a terminal device. Therefore, in the following explanation of the third embodiment, the elements having the function configuration similar to those in the first embodiment are assigned with the similar reference numerals used in the explanation of the first embodiment, and explanations thereof are omitted.

Figure 27:
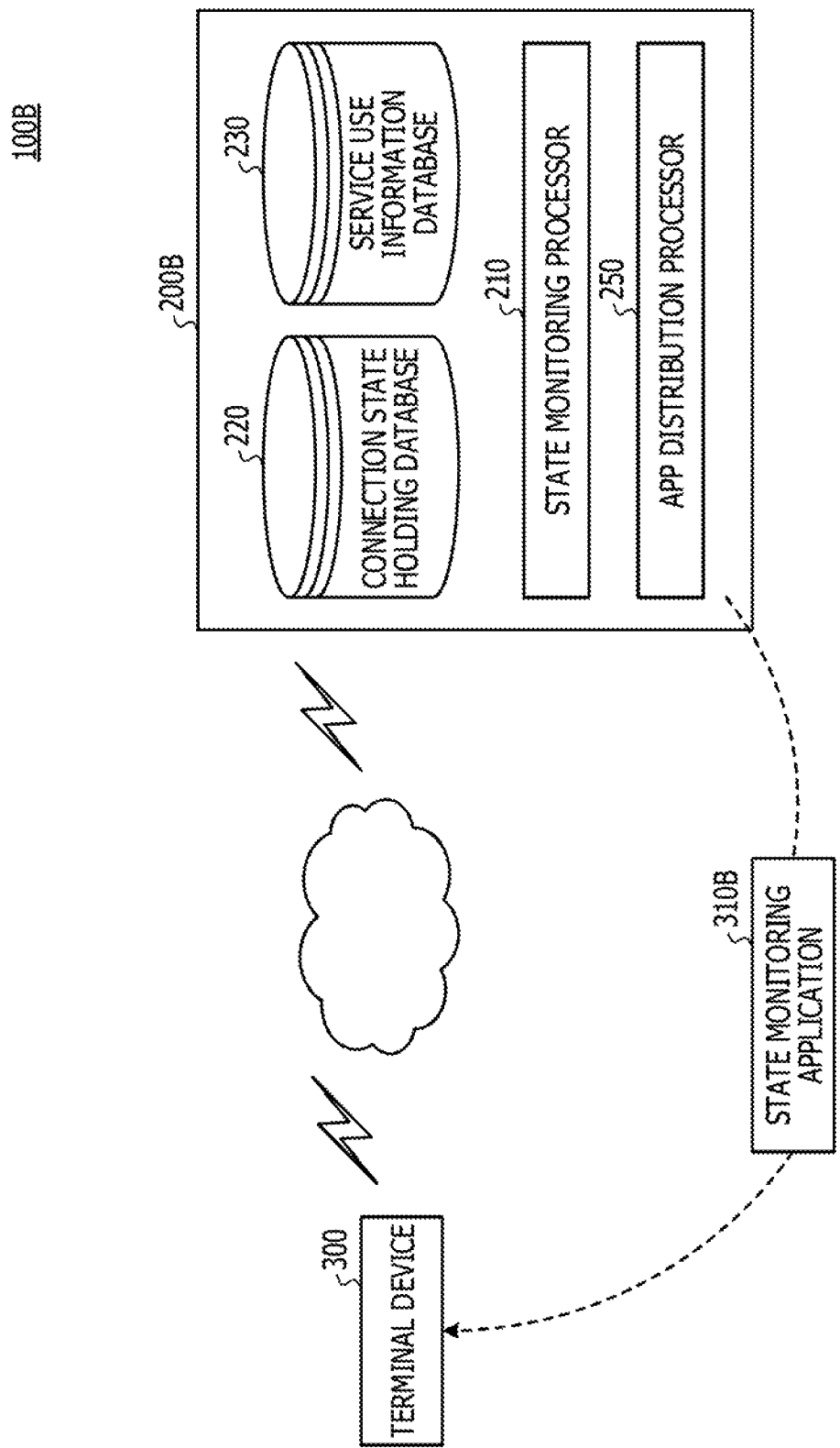
FIG. 27 is a diagram illustrating an example of a system configuration of an information processing system according to a third embodiment.

FIG. 27 is a diagram illustrating an example of a system configuration of an information processing system in the third embodiment. An information processing system 100B in the third embodiment includes a server 200B and the terminal device 300.

The server 200B in the third embodiment includes the state monitoring processor 210, the connection state holding database 220, the service use information database 230, and an app distribution processor 250.

When the app distribution processor 250 in the third embodiment accepts, for example, a distribution request of application from the terminal device 300, the app distribution processor 250 distributes a state monitor application 310B to the terminal device 300.

The state monitor application 310B is an application that implements the state monitoring processor 310. Further, the state monitor application 310B may be an application including the application 350 that uses the service 240.

In the third embodiment, for example, when a conference or the like is held using the information processing system 100B, the server 200B distributes the state monitor application 310B to the terminal devices 300 of participants before the conference is held to allow the information processing system 100B to be used in the conference.

The present disclosure is not limited to the embodiments that are specifically disclosed, but various modifications and changes are possible without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system, comprising:
   a server configured to
      execute a first process that includes managing a first connection state indicating a state of a connection with a terminal device based on whether the connection with the terminal device is determined to be established, and
      execute a second process that includes performing deallocation or reuse of a server-side resource allocated by the server, based on whether the first connection state is synchronized with a second connection state managed in the terminal device; and
   the terminal device configured to
      perform wireless communication in at least a part of a connection path to the server,
      execute a third process that includes repeatedly checking a connection with the server using the at least the part of the connection path in which the wireless communication is performed, and managing the second connection state indicating a state of the connection with the server, based on whether the connection with the server is determined as established, and
      execute a fourth process that includes performing deallocation or reuse of a terminal-side resource allocated by the terminal device, based on whether the second connection state is synchronized with the first connection state,
   wherein the third process includes
      after the connection with the server is determined as not established continuously for a predetermined time or more, setting the second connection state to an off-line state indicating that the connection between the server and the terminal device is disconnected.

2. The information processing system according to claim 1,
   wherein the first process includes
   when the first connection state and the second connection state are not synchronized, setting the first connection state to an off-line state indicating that the connection between the server and the terminal device is disconnected to cause the first connection state to synchronize with the second connection state, and thereafter establishing connection with the terminal device,
   wherein the third process includes
   when the first connection state and the second connection state are not synchronized, setting the second connection state to the off-line state to cause the second connection state to synchronize with the first connection state, and thereafter establishing connection with the server.

3. The information processing system according to claim 1,
   wherein the second process includes
   performing deallocation of the server-side resource, when the first connection state becomes the off-line state indicating that the connection between the server and the terminal device is disconnected,
   wherein the fourth process includes
   performing deallocation of the terminal-side resource when the second connection state becomes the off-line state, and performing allocation of the terminal-side resource when the second connection state becomes an on-line state indicating that the connection between the server and the terminal device is established.

4. The information processing system according to claim 1,
   wherein the third process includes
   setting the second connection state to the on-line state after receiving from the server a notification indicating that the first connection state is the on-line state indicating that the connection between the server and the terminal device is established.

5. The information processing system according to claim 1,
   wherein the server is configured to
   execute a fifth process that includes receiving a use request of service provided by the server from the terminal device, and relaying the use request to the service,
   wherein the fifth process includes
   relaying the use request to the service when the first connection state is the on-line state indicating that the connection between the server and the terminal device is established, and
   not relaying the use request to the service when the first connection state is the off-line state indicating that the connection between the server and the terminal device is disconnected.

6. The information processing system according to claim 5,
   wherein the fifth process includes
   notifying the terminal device having made the use request that the service is unavailable when the relay of the use request is failed.

7. A server configured to perform communication with a terminal device, the server comprising:
a memory; and
a processor coupled to the memory and configured to
execute a first process that includes managing a first connection state indicating a state of connection with the terminal device based on whether the connection with the terminal device is determined as established, and
execute a second process that includes performing deallocation or reuse of a server-side resource allocated by the server based on whether the first connection state is synchronized with a second connection state managed in the terminal device,
wherein the first process includes
after the connection with the terminal device is determined as not established continuously for a predetermined time or more, setting the first connection state to an off-line state indicating that the connection between the server and the terminal device is disconnected,
wherein the terminal device to be communicated with the server is configured to
execute a third process that includes repeatedly checking a connection with the server using the connection path including the at least part in which the wireless communication is performed, and managing the second connection state indicating a state of the connection with the server based on whether the connection with the server is determined as established, and
execute a fourth process that includes performing deallocation or reuse of a terminal-side resource allocated by the terminal device, based on whether the second connection state is synchronized with a first connection state managed in the server and indicating a state of the connection with the terminal device,
wherein the third process includes
after the connection with the server is determined as not established continuously for a predetermined time or more, setting the second connection state to an off-line state indicating that the connection between the server and the terminal device is disconnected.

8. A terminal device configured to perform wireless communication in at least a part of a connection path to a server, the terminal device comprising:
a memory; and
a processor coupled to the memory and configured to
execute a first process that includes repeatedly checking a connection with the server using the at least the part of the connection path in which the wireless communication is performed, and managing a second connection state indicating a state of the connection with the server based on whether the connection with the server is determined as established, and
execute a second process that includes performing deallocation or reuse of a terminal-side resource allocated by the terminal device, based on whether the second connection state is synchronized with a first connection state managed in the server and indicating a state of the connection with the terminal device,
wherein the first process includes
after the connection with the server is determined as not established continuously for a predetermined time or more, setting the second connection state to an off-line state indicating that the connection between the server and the terminal device is disconnected,
wherein the server to be communicated with the terminal device is configured to
execute a first process that includes managing a first connection state indicating a state of connection with the terminal device based on whether the connection with the terminal device is determined as established, and
execute a second process that includes performing deallocation or reuse of a server-side resource allocated by the server based on whether the first connection state is synchronized with a second connection state managed in the terminal device,
wherein the first process includes
after the connection with the terminal device is determined as not established continuously for a predetermined time or more, setting the first connection state to an off-line state indicating that the connection between the server and the terminal device is disconnected.

* * * * *